(12) United States Patent
Dinwoodie

(10) Patent No.: US 8,965,911 B2
(45) Date of Patent: Feb. 24, 2015

(54) SEARCHING AND STORING DATA IN A TREE DATA STRUCTURE USING PREFIX-MATCHING NODE

(71) Applicant: Metaswitch Networks Ltd., Enfield (GB)

(72) Inventor: Adam Dinwoodie, Enfield (GB)

(73) Assignee: Metaswitch Networks Ltd, Enfield (GB)

( * ) Notice: Subject to any disclaimer, the term of this patent is extended or adjusted under 35 U.S.C. 154(b) by 188 days.

(21) Appl. No.: 13/629,912

(22) Filed: Sep. 28, 2012

(65) Prior Publication Data

US 2013/0268542 A1    Oct. 10, 2013

(30) Foreign Application Priority Data

Sep. 28, 2011    (GB) .................................. 1116736.8

(51) Int. Cl.
*G06F 17/30*    (2006.01)
*H04L 12/745*    (2013.01)

(52) U.S. Cl.
CPC .... *G06F 17/30327* (2013.01); *G06F 17/30625* (2013.01); *H04L 45/748* (2013.01); *Y10S 707/956* (2013.01)
USPC ...... 707/758; 707/797; 707/956; 707/E17.05; 707/E17.012

(58) Field of Classification Search
USPC ............ 707/758, 797, 956, E17.05, E17.012, 707/E17.097
See application file for complete search history.

(56) References Cited

U.S. PATENT DOCUMENTS

| | | | | |
|---|---|---|---|---|
| 5,768,423 | A * | 6/1998 | Aref et al. ...................... | 382/228 |
| 7,130,847 | B2 * | 10/2006 | Waters et al. .................. | 707/706 |
| 7,610,284 | B2 | 10/2009 | Lee | |
| 7,986,696 | B1 * | 7/2011 | Miliavisky et al. ........... | 370/392 |
| 8,566,276 | B1 * | 10/2013 | An .................................. | 707/608 |
| 8,631,043 | B2 * | 1/2014 | Hao et al. ....................... | 707/797 |
| 2003/0204513 | A1 | 10/2003 | Bumbulis | |
| 2004/0111402 | A1 * | 6/2004 | Waters et al. ..................... | 707/3 |
| 2006/0106901 | A1 | 5/2006 | Guionnet et al. | |
| 2008/0046474 | A1 | 2/2008 | Sismanis | |
| 2011/0184922 | A1 | 7/2011 | Lee | |

FOREIGN PATENT DOCUMENTS

WO    2004006061 A2    1/2004

OTHER PUBLICATIONS

Liu et al., "Incremental Forwarding Table Aggregation", GlobeCom 2010, Miami, FL, Dec. 6-10, 2010, pp. 1-6.
Zhao et al., "On the Aggregatability of Router Forwarding Tables", INFOCOM IEEE, May 2010, pp. 848-856.
Chang et al., "A Fast and Memory Efficient Dynamic IP Lookup Algorithm Based on B-Tree", IEEE Computer Society, Jun. 2009, pp. 278-284.

(Continued)

*Primary Examiner* — Leslie Wong
(74) *Attorney, Agent, or Firm* — EIP US LLP

(57) ABSTRACT

Nodes in a tree data structure are associated with respective node keys. At least some of the nodes are associated with at least one respective node rank. The structure is searched to attempt to identify a preferred prefix-matching node on the basis of attempting to find a prefix-matching node that has a prefix match with a search key and which has a preferred node rank relative to a node rank associated with a node which may have a longer prefix match. If the prefix-matching node is identified, a dependent node rank identifier associated with the prefix-matching node is used to determine that the prefix-matching node has the preferred node rank. The dependent node rank identifier indicates at least a node rank of a node which may have a longer prefix match than the prefix-matching node. The prefix-matching node is selected, if identified, as a preferred prefix-matching node.

12 Claims, 16 Drawing Sheets

(56) References Cited

OTHER PUBLICATIONS

Chen et al., "Combining Pat-Trees and Signature Files for Query Evaluation in Document Databases", Proceeding DEXA '99 Proceedings of the 10th International Conference on Database and Expert Systems Applications, 1999, pp. 473-484.

Warkhede et al., "Multiway Range Trees: Scalable IP Lookup with Fast Updates", Computer Networks, 2004, vol. 4, 2004, pp. 289-303.
Hopfner et al., "Query Based Client Indexing in Client/Server Information Systems", Journal of Computer Science, 2007, vol. 3, No. 10, pp. 773-779.

* cited by examiner

SEARCHING AND STORING DATA IN A
TREE DATA STRUCTURE USING
PREFIX-MATCHING NODE

FIELD OF THE INVENTION

The present invention relates to methods of searching, and a method of storing data in, a database, to apparatus for searching, and for storing data in, a database and to computer program products.

BACKGROUND

Prefix trees (commonly called "tries") are ordered data structures that are used extensively in computer science. There are various enhancements to tries that are intended to improve a trie structure's performance when used for longest-prefix searching—identifying the longest match with a search key—such as for IP routing tables.

Tries can also be used in the context of traffic processing. For example, a first trie could be used to identify blacklisted traffic sources. A source address identifier in incoming traffic can be used as a search key into the first trie and, if a match is found in the first trie, the traffic can be determined to be from a blacklisted traffic source and can be dropped immediately. A second trie could be used to identify whitelisted traffic sources. If a match is found between a source address in incoming traffic and a key in the second trie, the traffic can be determined to be from a whitelisted traffic source and can be accepted and processed accordingly. A third trie could be used to identify non-critically blacklisted traffic sources. If a match is found between a source address in incoming traffic and a key in the third trie, the traffic can be determined to be from a non-critically blacklisted traffic source and can be accepted and handled at a low priority or dropped, depending on available system resources. Incoming traffic from a source that is not identified in any of the tries may be treated as being from an untrusted source and may be handled at a low priority, albeit a higher priority than traffic from a source which is non-critically blacklisted.

Although this allows traffic from different traffic sources to be handled differently, a considerable amount of searching may be required to identify a trie in which there is a match, if at all. This can slow down traffic-processing times, which is undesirable in most communication systems.

It would therefore be desirable to provide improved methods for searching, and storing data in, a database.

SUMMARY

In accordance with first embodiments, there is provided a method of searching a database using a search key, the database containing data stored in a tree data structure, the tree data structure comprising a plurality of nodes that are associated with respective node keys, the method comprising:
  searching the tree data structure to attempt to identify a preferred prefix-matching node on the basis of attempting to find a node that has a longer prefix match with the search key than a prefix-matching node that has a prefix match with the search key, wherein at least some of the nodes are associated with at least one respective node rank;
  searching the tree structure to attempt to identify a preferred prefix-matching node on the basis of attempting to find a prefix-matching node that has a prefix match with the search key and which has a preferred node rank relative to a node rank associated with a node which may have a longer prefix match with the search key;
  determining that the prefix-matching node, if identified, has the preferred node rank based at least in part on using a dependent node rank identifier associated with the prefix-matching node, the dependent node rank identifier indicating at least a node rank of a node which may have a longer prefix match with the search key than the prefix-matching node; and
  selecting the prefix-matching node which has the preferred node rank, if identified, as a preferred prefix-matching node, in preference to a node having a less-preferred node rank which may have a longer prefix match with the search key.

According to second embodiments, there is provided a method of storing data in a database, the database containing data stored in a tree data structure, the tree data structure comprising a first node that is associated with a first node key, the method comprising:
  associating the first node with the first node rank;
  adding a second node to the tree data structure as an ancestor or dependant node of the first node;
  associating the second node with a second node key; associating the second node with a second node rank; and
  adding the second node as an ancestor node of the first node and identifying the first node rank in a dependant node rank identifier associated with the second node; or
  adding the second node as a dependant node of the first node and identifying the second node rank in a dependant node rank identifier associated with the first node.

According to third embodiments, there is provided apparatus for searching a database using a search key, the database containing data stored in a tree data structure, the tree data structure comprising a plurality of nodes that are associated with respective node keys, wherein the apparatus is arranged to:
  search the tree data structure to attempt to identify a preferred prefix-matching node on the basis of attempting to find a node that has a longer prefix match with the search key than a prefix-matching node that has a prefix match with the search key, wherein at least some of the nodes are associated with at least one respective node rank;
  search the tree structure to attempt to identify a preferred prefix-matching node on the basis of attempting to find a prefix-matching node that has a prefix match with the search key and which has a preferred node rank relative to a node rank associated with a node which may have a longer prefix match with the search key;
  determine that the prefix-matching node, if identified, has the preferred node rank based at least in part on using a dependent node rank identifier associated with the prefix-matching node, the dependent node rank identifier indicating at least a node rank of a node which may have a longer prefix match with the search key than the prefix-matching node; and
  select the prefix-matching node which has the preferred node rank, if identified, as a preferred prefix-matching node, in preference to a node having a less-preferred node rank which may have a longer prefix match with the search key.

According to fourth embodiments, there is provided apparatus for storing data in a database, the database containing data stored in a tree data structure, the tree data structure comprising a first node that is associated with a first node key, the apparatus being arranged to:

associate the first node with the first node rank;

add a second node to the tree data structure as an ancestor or dependant node of the first node;

associate the second node with a second node key, the second node key being associated with data to be stored in the database;

associate the second node with a second node rank; and add the second node as an ancestor node of the first node and identifying the first node rank in a dependant node rank identifier associated with the second node; or add the second node as a dependant node of the first node and identifying the second node rank in a dependant node rank identifier associated with the first node.

According to fifth embodiments, there is provided a computer program product comprising a non-transitory computer-readable storage medium having computer readable instructions stored thereon, the computer readable instructions being executable by a computerized device to cause the computerized device to perform a method for searching a database using a search key, the database containing data stored in a tree data structure, the tree data structure comprising a plurality of nodes that are associated with respective node keys, the method comprising:

searching the tree data structure to attempt to identify a preferred prefix-matching node on the basis of attempting to find a node that has a longer prefix match with the search key than a prefix-matching node that has a prefix match with the search key, wherein at least some of the nodes are associated with at least one respective node rank;

searching the tree structure to attempt to identify a preferred prefix-matching node on the basis of attempting to find a prefix-matching node that has a prefix match with the search key and which has a preferred node rank relative to a node rank associated with a node which may have a longer prefix match with the search key;

determining that the prefix-matching node, if identified, has the preferred node rank based at least in part on using a dependent node rank identifier associated with the prefix-matching node, the dependent node rank identifier indicating at least a node rank of a node which may have a longer prefix match with the search key than the prefix-matching node; and selecting the prefix-matching node which has the preferred node rank, if identified, as a preferred prefix-matching node, in preference to a node having a less-preferred node rank which may have a longer prefix match with the search key.

According to sixth embodiments, there is provided a computer program product comprising a non-transitory computer-readable storage medium having computer readable instructions stored thereon, the computer readable instructions being executable by a computerized device to cause the computerized device to perform a method for storing data in a database, the database containing data stored in a tree data structure, the tree data structure comprising a first node that is associated with a first node key and a first node rank, the method comprising:

associating the first node with the first node rank;

adding a second node to the tree data structure as an ancestor or dependant node of the first node;

associating the second node with a second node key;

associating the second node with a second node rank; and adding the second node as an ancestor node of the first node and identifying the first node rank in a dependant node rank identifier associated with the second node; or adding the second node as a dependant node of the first node and identifying the second node rank in a dependant node rank identifier associated with the first node.

According to seventh embodiments, there is provided a method of searching a database using a search key, the database containing data stored in a tree structure, the tree structure comprising a plurality of nodes including a first node that is associated with a first node key and a first node rank, and a second node that is a dependant node of the first node and that is associated with a second node key and a second node rank, the second node potentially being a longer-prefix-matching node than the first node, wherein the first node is associated with a dependant node rank identifier which indicates at least the second node rank, the method comprising:

determining that the first node is a prefix-matching node; and identifying the first node as a preferred prefix-matching node based at least in part on the dependant node rank identifier if the first node rank is preferable relative to the second node rank notwithstanding the second node potentially being a longer-prefix-matching node than the first node.

Further features and advantages of the invention will become apparent from the following description of preferred embodiments of the invention, given by way of example only, which is made with reference to the accompanying drawings.

DETAILED DESCRIPTION

Figure 1:
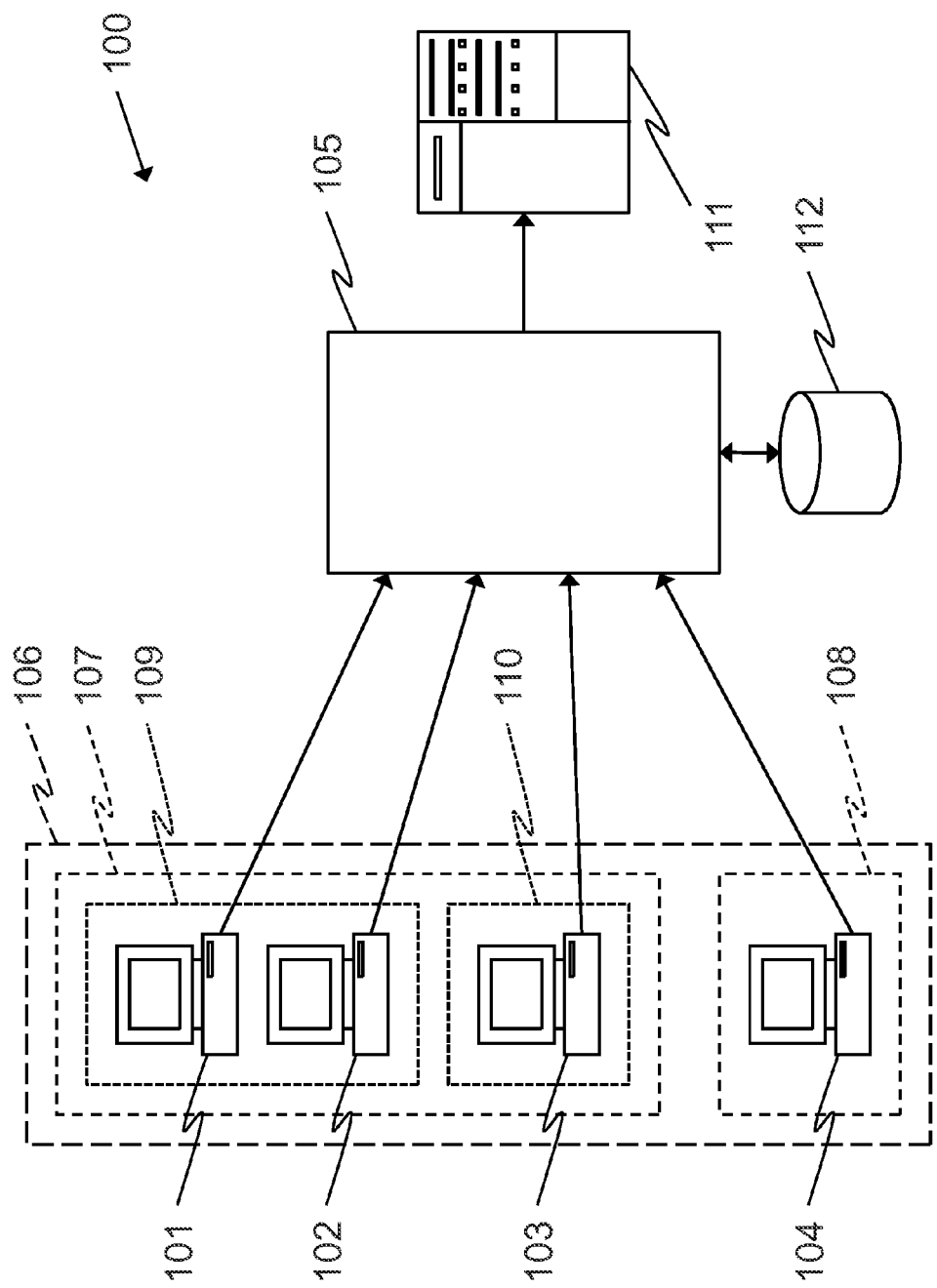
FIG. 1 is a schematic representation of a communication system.

In embodiments, a method of searching a database using a search key is provided. The database contains data stored in a tree data structure. The tree data structure comprises a plurality of nodes that are associated with respective node keys. The tree data structure is searched to attempt to identify a preferred prefix-matching node on the basis of attempting to find a node that has a longer prefix match with the search key than a prefix-matching node that has a prefix match with the search key. At least some of the nodes are associated with at least one respective node rank. The tree structure is searched to attempt to identify a preferred prefix-matching node on the basis of attempting to find a prefix-matching node that has a prefix match with the search key and which has a preferred node rank relative to a node rank associated with a node which may have a longer prefix match with the search key. The prefix-matching node, if identified, is determined to have the preferred node rank based at least in part on using a dependent node rank identifier associated with the prefix-matching node. The dependent node rank identifier indicates at least a node rank of a node which may have a longer prefix match with the search key than the prefix-matching node. The prefix-matching node which has the preferred node rank, if identified, is selected as a preferred prefix-matching node, in preference to a node having a less-preferred node rank which may have a longer prefix match with the search key.

This method can provide faster look-up results and better occupancy than searching for data that is stored in separate tree structures. It is particularly suited to determining a preferred prefix-matching node on the basis of it being associated with a preferred node rank, instead of necessarily seeking the node that has the longest prefix match with a given key. The prefix-matching node may be selected as the preferred prefix-matching node without determining whether the node which may have a longer prefix match with the search key does, in fact, have a longer prefix match with the search key. This can reduce lookup times when searching the database.

In some embodiments, the method comprises selecting the prefix-matching node as the preferred prefix-matching node if its node rank is at least one rank higher than the less-preferred node rank. This provides a convenient preferred prefix-matching selection rule for selecting the preferred prefix-matching node based on a relative rank of the prefix-matching node. Some embodiments may comprise selecting the prefix-matching node as the preferred prefix-matching node if its node rank is at least two ranks higher than the less-preferred node rank.

In some embodiments, the dependant node rank identifier indicates the node ranks of every node that may have a longer prefix match with the search key than the prefix-matching node. The prefix-matching node may be selected as the preferred prefix-matching node without determining whether any node which may have a longer prefix match with the search key does, in fact, have a longer prefix match with the search key. This can reduce lookup times when searching the database.

Some embodiments provide a method of handling data in a communication system. Traffic comprising a traffic parameter is received. A traffic-handling database is searched using a search key that is based on the traffic parameter and a method of searching the database in accordance with embodiments. Traffic-handling information associated with the preferred prefix-matching node is received. The received traffic is handled based on the traffic-handling information. The method of searching a database according to the first embodiments provides efficient lookup in the context of traffic handling, such as filtering and/or prioritisation, in a communication system, where traffic from different parts of the communication system can be assigned different traffic handling rules, such as different prioritisation or filtering rules.

In some embodiments, the communication system comprises a plurality of network parts. A given node is associated with incoming traffic from a given network part. The given node is associated with a node rank based on a manner in which incoming traffic from the given network part is to be handled. A higher node rank is associated with a preferred traffic-handling scheme. This allows traffic from different traffic sources to be handled differently, while providing quick lookup.

In some embodiments, a first node rank is associated with high-priority traffic and a second node rank is associated with low-priority traffic. Incoming traffic is handled based on its priority. This facilitates traffic prioritisation in a communication system.

In some embodiments, the traffic parameter comprises a traffic source identifier.

In some embodiments, the tree data structure comprises a trie. Tries provide fast key lookup time and are particularly suitable for longest-prefix matching.

In some embodiments, the tree data structure comprises a radix trie.

A radix trie allows quick determination of whether the search key corresponds to a node key in the tree data structure.

In some embodiments, the dependent node rank identifier indicates that the node rank of the node which may have a longer prefix match with the search key than the prefix-matching node has a less preferred node rank relative to the node rank associated with the prefix-matching node.

In embodiments, a method of storing data in a database is provided. The database contains data stored in a tree data structure. The tree data structure comprises a first node that is associated with a first node key. The first node is associated with the first node rank. A second node is added to the tree data structure as an ancestor or dependant node of the first node. The second node is associated with a second node key. The second node is associated with a second node rank. The second node is added as an ancestor node of the first node and the first node rank is identified in a dependant node rank identifier associated with the second node, or the second node is added as a dependant node of the first node and the second node rank is identified in a dependant node rank identifier associated with the first node. This provides a method of storing data in a database that can provide faster look-up results and better occupancy than would be the case if the data were stored in separate tree structures. It is particularly suited to determining a preferred prefix-matching node on the basis of it being associated with a preferred node rank, instead of necessarily seeking the node that has the longest prefix match with a given key. This provides for faster lookup in relation to the database.

In some embodiments, the first node is associated with data originating from a first data source and the second node is associated with data from a second, different data source, and the first node rank is associated with the first data source and the second node rank is associated with the second data source. Nodes can be ranked consistently based on the data source from which they originate. In some embodiments, at least one of the first and second data sources comprises a database containing data stored in a tree data structure.

In embodiments, apparatus for searching a database using a search key is provided. The database contains data stored in a tree data structure. The tree data structure comprises a plurality of nodes that are associated with respective node keys. The apparatus is arranged to search the tree data structure to attempt to identify a preferred prefix-matching node on the basis of attempting to find a node that has a longer prefix match with the search key than a prefix-matching node that has a prefix match with the search key. At least some of the nodes are associated with at least one respective node rank. The apparatus is further arranged to search the tree structure to attempt to identify a preferred prefix-matching node on the basis of attempting to find a prefix-matching node that has a prefix match with the search key and which has a preferred node rank relative to a node rank associated with a node which may have a longer prefix match with the search key; to determine that the prefix-matching node, if identified, has the preferred node rank based at least in part on using a dependent node rank identifier associated with the prefix-matching node, the dependent node rank identifier indicating at least a node rank of a node which may have a longer prefix match with the search key than the prefix-matching node; and to select the prefix-matching node which has the preferred node rank, if identified, as a preferred prefix-matching node, in preference to a node having a less-preferred node rank which may have a longer prefix match with the search key.

In embodiments, apparatus for storing data in a database is provided. The database contains data stored in a tree data structure. The tree data structure comprises a first node that is associated with a first node key. The apparatus is arranged to associate the first node with the first node rank; add a second node to the tree data structure as an ancestor or dependant node of the first node; associate the second node with a second node key, the second node key being associated with data to be stored in the database; associate the second node with a second node rank; and add the second node as an ancestor node of the first node and identifying the first node rank in a dependant node rank identifier associated with the second node, or add the second node as a dependant node of the first node and identifying the second node rank in a dependant node rank identifier associated with the first node.

In embodiments, a computer program product comprising a non-transitory computer-readable storage medium having computer readable instructions stored thereon is provided. The computer readable instructions are executable by a computerized device to cause the computerized device to perform a method for searching a database using a search key. The database contains data stored in a tree data structure. The tree data structure comprises a plurality of nodes that are associated with respective node keys. The tree data structure is searched to attempt to identify a preferred prefix-matching node on the basis of attempting to find a node that has a longer prefix match with the search key than a prefix-matching node that has a prefix match with the search key. At least some of the nodes are associated with at least one respective node rank. The tree structure is searched to attempt to identify a preferred prefix-matching node on the basis of attempting to find a prefix-matching node that has a prefix match with the search key and which has a preferred node rank relative to a node rank associated with a node which may have a longer prefix match with the search key. The prefix-matching node, if identified, is determined to have the preferred node rank based at least in part on using a dependent node rank identifier associated with the prefix-matching node. The dependent node rank identifier indicates at least a node rank of a node which may have a longer prefix match with the search key than the prefix-matching node. The prefix-matching node which has the preferred node rank, if identified, is selected as a preferred prefix-matching node, in preference to a node having a less-preferred node rank which may have a longer prefix match with the search key.

In embodiments, a computer program product comprising a non-transitory computer-readable storage medium having computer readable instructions stored thereon is provided. The computer readable instructions are executable by a computerized device to cause the computerized device to perform a method for storing data in a database. The database contains data stored in a tree data structure. Tree data structure comprises a first node that is associated with a first node key and a first node rank. The method comprises associating the first node with the first node rank; adding a second node to the tree data structure as an ancestor or dependant node of the first node; associating the second node with a second node key; associating the second node with a second node rank; and adding the second node as an ancestor node of the first node and identifying the first node rank in a dependant node rank identifier associated with the second node, or adding the second node as a dependant node of the first node and identifying the second node rank in a dependant node rank identifier associated with the first node.

In embodiments, a method of searching a database using a search key is provided. The database contains data stored in a tree structure. The tree structure comprises a plurality of nodes including a first node that is associated with a first node key and a first node rank and a second node that is a dependant node of the first node and that is associated with a second node key and a second node rank. The second node is potentially a longer-prefix-matching node than the first node. The first node is associated with a dependant node rank identifier which indicates at least the second node rank. Searching the database comprises determining that the first node is a prefix-matching node and identifying the first node as a preferred prefix-matching node based at least in part on the dependant node rank identifier if the first node rank is preferable relative to the second node rank notwithstanding the second node potentially being a longer-prefix-matching node than the first node.

FIG. 1 is a schematic representation of a communication system 100.

The communication system 100 comprises four endpoints 101, 102, 103, 104, that are shown in FIG. 1 and are described herein as computing devices. The computing devices 101, 102, 103, 104 may be Personal Computers (PCs), mobile telephones, Personal Digital Assistants (PDAs) or the like. The computing devices 101, 102, 103, 104 are communicatively coupled to a traffic handler 105 which handles traffic from the computing devices 101, 102, 103, 104. The couplings between the computing devices 101, 102, 103, 104 and the traffic handler 105 may be direct or may be via one or more intermediate communication networks (not shown), such as the Internet, a Local Area Network (LAN), a cellular network (such as a Global System for Mobile Communications (GSM) network) or the like. The couplings may include one or more intermediate network elements (not shown), such as switches, routers, hubs, gateways or the like. Although four computing devices 101, 102, 103, 104 are shown in FIG. 1, it will be appreciated that, in reality, the communication system 100 may include significantly more computing devices or other endpoints.

As depicted in FIG. 1, the computing devices 101, 102, 103, 104, are located in a network 106, indicated by a long-dashed box. The network 106 includes first and second subnetworks or subnets 107, 108 respectively which are indicated by respective dashed boxes. A subnet is a logical subdivision of a network.

By way of an example, the network 106 may be an Internet Protocol (IP) network in which endpoints, such as the computing devices 101, 102, 103, 104, are identified by means of respective IP addresses; referred to herein as $IP_{101}$, $IP_{102}$, $IP_{103}$ and $IP_{104}$ respectively. An Internet Protocol version 4 (IPv4) address is typically denoted as a series of four decimal numbers separated by decimal points. Each of the decimal numbers represents eight bits of a 32-bit IPv4 address, so that each decimal number ranges from 0 to 255. The IP addresses of all computing devices in a given subnet share a common, identical, most-significant bit-group or prefix in their IP addresses.

The first subnet 107 includes first and second further subnets 109, 110 respectively which are indicated by respective dotted boxes. The first subnet 107 includes three computing devices 101, 102, 103. Two of the computing devices 101, 102 are located in the first further subnet 109 and one of the computing devices 103 is located in the second further subnet 110. The other computing device 104 is located in the second subnet 108.

The traffic handler 105 receives incoming traffic from the computing devices 101, 102, 103, 104 via the respective couplings. The traffic handler 105 may perform various types of traffic handling, for example traffic prioritisation, traffic filtering, traffic shaping or the like.

The traffic handler 105 may be communicatively coupled to one or more further networks or network elements, such as a backend server 111. The backend server 111 serves requests from the computing devices 101, 102, 103, 104 and possibly other elements in the communication system 100. For example, the backend server 111 may comprise one or more of a data file server, a media server, a web server or the like.

The traffic handler 105 may be configured to handle incoming traffic from different traffic sources, such as computing devices 101, 102, 103, 104, differently, for example based on the subnet in which they are located or whether they are associated with specific traffic-handling rules.

For example, the traffic handler 105 may be configured to prioritise incoming traffic from higher-priority traffic sources or subnets over traffic from lower-priority traffic sources or subnets. For example, emergency services and/or premium subscribers may have their traffic prioritised over traffic from non-premium subscribers.

In another example, traffic handler 105 may be configured to filter incoming traffic based on the source from which the traffic originates. For example, the backend server 111 may be liable to Denial of Service (DoS) or Distributed Denial of Service (DDoS) attacks in which malicious endpoints attempt to overwhelm the backend server 111 by flooding it with requests. In such cases, it may be desirable to drop traffic from certain endpoints that are identified as malicious or potentially malicious endpoints instead of forwarding malicious or potentially malicious traffic from such endpoints to the backend server 111.

The traffic handler 105 may, therefore, have access to a traffic-handling database 112 comprising traffic handling information. The database 112 identifies how traffic from a given traffic source or range of traffic sources should be handled, for example on the basis of a traffic parameter in the traffic. The traffic parameter may, for example, be the IP address of the traffic source from which the traffic originates. The traffic handler 105 uses the traffic parameter, or a parameter derived therefrom, as a search key into the database 112 and retrieves corresponding traffic handling information which identifies how to handle that traffic.

As explained above, traffic sources in an IP network may be identified by means of an IP address. A prefix refers to an IP address or its initial portion. Using IPv4, for example, "192.168.0.0/16" is a 16-bit prefix of the IP addresses "192.168.1.4", "192.168.200.200" and "192.168.26.8". In fact, "192.168.0.0/16" is a 16-bit prefix of all the IP addresses in the range from "192.168.0.0" to "192.168.255.255".

The database 112 may contain traffic-handling information for the prefix "192.168.0.0/16" and the traffic handler 105 may thus be able to handle traffic from all IP destination addresses in the range from "192.168.0.0" to "192.168.255.255" based on the associated traffic-handling information. However, the database 112 may also contain different, but more specific, traffic-handling information for a particular traffic source having the 192.168.0.0/16" prefix, such as "192.168.4.5".

In some cases, it is desirable to identify the longest prefix-match in the database 112 since the longest prefix-match provides the most specific information as to how to handle traffic from a given traffic source. However, as can be seen from the following example, it is not always the longest prefix-match that provides the preferred traffic-handling information for handling the traffic from a given traffic source.

In some embodiments, the traffic handler 105 may consider an unknown traffic source as untrusted. The traffic handler 105 may process traffic from unknown traffic sources, albeit at a relatively low priority. Once the traffic handler 105 knows about and trusts a traffic source, for example if it has exchanged an initial handshake with the traffic source, the traffic source is assigned to a whitelist. The traffic handler 105 can also blacklist certain traffic sources to protect against DoS or DDoS attacks and may be configured to process or drop traffic received from blacklisted traffic sources depending, for example, on the volume of traffic it is currently processing. To protect against DoS or DDoS attacks, arbitrarily sized subnets may be blacklisted. For example, although an example is given above of a 16-bit prefix, different bit-sized prefixes in the range 1 to 31 inclusive could be used to specify different-sized subnets. Arbitrarily sized subnets may, instead, be whitelisted so as to trust a range of potential traffic sources without having to perform individual handshakes with each of the traffic sources located in the subnet.

Depending on the severity of a DoS or DDoS attack, traffic may be processed or may be dropped from a traffic source that is a specifically whitelisted traffic source in a blacklisted subnet. In such a situation, it would be preferable to identify that the traffic should be handled using blacklist processing, rather than whitelist processing, even though the traffic source itself has been whitelisted.

As such, different parts of the network 106 can be associated with different traffic-handling rules or schemes, which, in turn, can be associated with different ranks Traffic from a traffic source located in a network part associated with a higher-ranked traffic-handling rule may be processed according to that rule rather than using a lower-ranked traffic-handling rule even if the lower-ranked traffic-handling rule is associated with the traffic source itself.

In such cases, it is generally desirable that lookups into the database 112 to determine how to handle traffic from a given traffic source be quick and efficient. As such, the database may contain data stored in a tree data structure, which can typically be searched quickly and efficiently.

In embodiments, the traffic handler 105 comprises at least one processor and at least one memory including computer program code. The at least one memory and the computer program code are configured to, with the at least one processor, cause the traffic handler 105 at least to perform searching of and/or storing data in a database.

Figure 2:
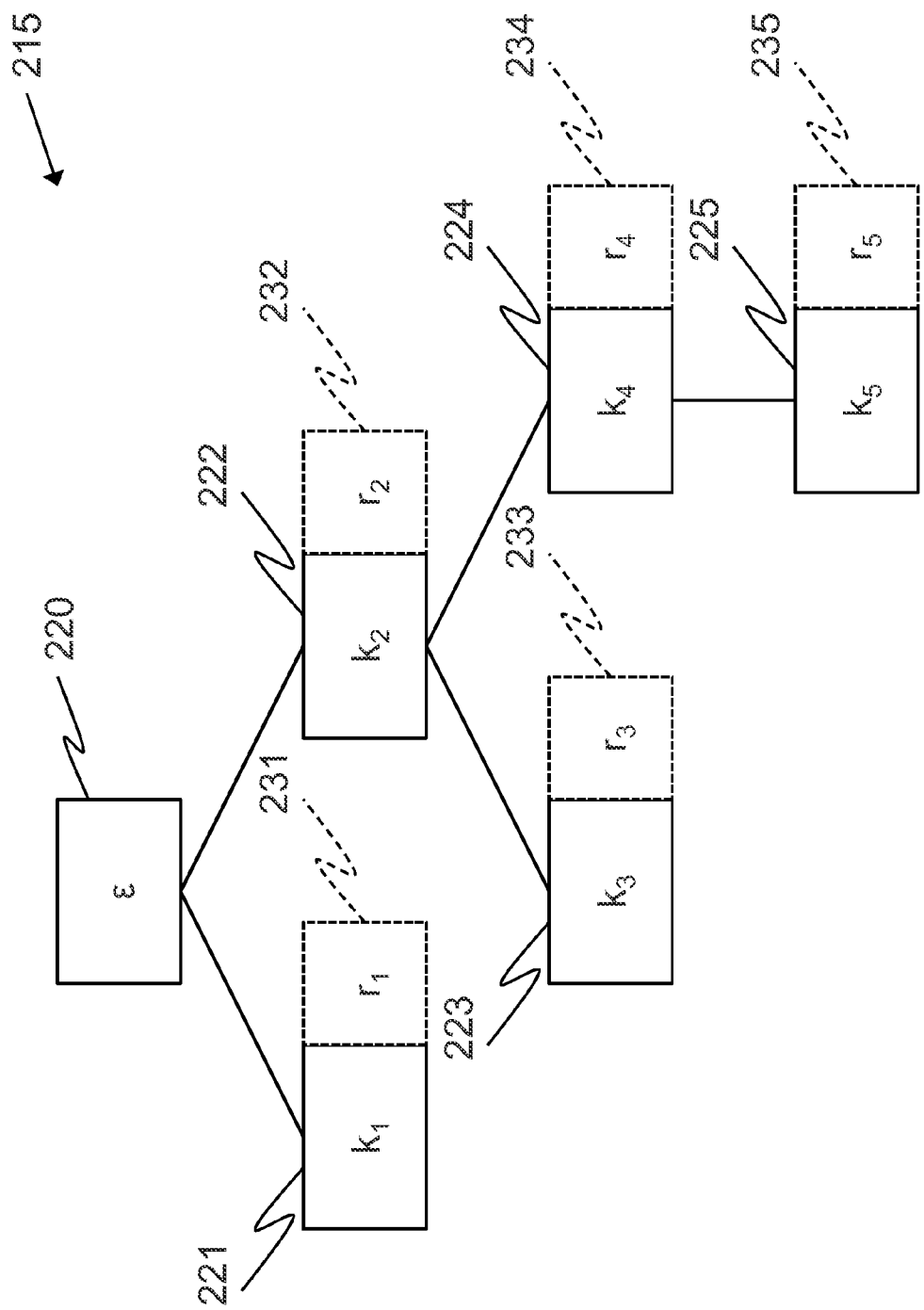
FIG. 2 is a schematic representation of a tree data structure.

FIG. 2 is a schematic representation of a tree data structure 215.

The tree data structure 215 is data structure with a tree-shaped form having a set of linked nodes stemming from a root node 220. All other nodes in the tree structure 215 can be reached from the root node 220 by following edges or links. Each node has no or some child nodes, which are located immediately below it in the tree data structure 215.

In the tree structure 215 shown in FIG. 2, the root node 220 has two child nodes, which are referred to herein as the first and second nodes 221 and 222 respectively. The second node also has two child nodes, which are referred to herein as the third and fourth nodes 223, 224 respectively. The fourth node 224 has an only child node, which is referred to herein as the fifth node 225.

A node that has a child is called the child's parent. Thus, the root node 220 is a parent of both the first and second nodes 221, 222, the second node 222 is a parent of both the third and fourth nodes 223, 224 and the fourth node 224 is a parent of the fifth node 225. A node has at most one parent.

A node that has at least one child node and has a parent node is called an internal or inner node. The second and fourth nodes 222, 224 are, thus, internal nodes.

A leaf or terminal node is a node that has no child nodes, which are often furthest from the root node 220. The first, third and fifth nodes 221, 223, 225 in the tree structure 215 are, thus, leaf nodes.

An ancestor of a node is that node's parent, or that node's parent's parent, and so on. The root node 220 is an ancestor to every other node in the tree. The set of ancestors of a given node is the set of nodes on the path through the tree from the root node 220 to that node. For example, the ancestors of the fifth node 225 are the fourth node 224, the second node 222 and the root node 220.

The descendants of a node are that node's children, or that node's children's children, and so on. For example, the descendants of the second node 222 are the third node 223, the fourth node 224 and the fifth node 225.

A node is an ancestor of another node if and only if the other node is a descendant of that node.

Each node may contain a value or a key or may represent a separate data structure. In the tree data structure 215 shown in FIG. 2, the first node 221 is associated with a first node key, $k_1$, which is associated with an IP address for the second subnet 108. The second node 222 is associated with a second node key, $k_2$, which is associated with an IP address for the first subnet 107. The third node 223 is associated with a third node key, $k_3$, which is associated with an IP address for the second further subnet 110. Since the second further subnet 110 is a subnet of the first subnet 107, the second node key, $k_2$, and the third node key, $k_3$, share a common prefix; namely the prefix part of the IP address associated with the first subnet 107. The fourth node 224 is associated with a fourth node key, $k_4$, which is associated with an IP address for the first further subnet 109. Since the first further subnet 109 is a subnet of the first subnet 107, the second node key, $k_2$, and the fourth node key, $k_4$, share a common prefix; namely the prefix part of the IP address associated with the first subnet 107. The fifth node 225 is associated with a fifth node key, $k_5$, which is associated with an IP address, $IP_{101}$, of computing device 101. Since computing device 101 is in the first further subnet 109 which is a subnet of the first subnet 107, the second node key, $k_2$, and the fifth node key, $k_5$, share a common prefix; namely the prefix part of the IP address associated with the first subnet 107. Furthermore, the fourth node key, $k_4$, and the fifth node key, $k_5$, share a common prefix; namely the prefix part of the IP address associated with the first further subnet 109.

There are various different types of tree data structure, each of which has different associated benefits, some of which are discussed below.

A binary search tree, for example, is a tree data structure in which each node has a corresponding node key. For a node with a node key having a given value, a left subtree of that node contains one or more nodes having respective node keys with values less than the given value and a right subtree of that node contains one or more nodes having respective nodes keys with values greater than the given value. Sorting and searching algorithms for binary search trees tend to be relatively efficient.

A trie is an ordered tree data structure that is used to store an associative array where the keys are typically strings. All the descendant nodes of a given node have a common prefix of the string associated with the given node.

Tries provide fast key lookup time and are suitable for longest-prefix matching. Longest-prefix matching involves identifying a node whose node key shares the longest prefix match with a given search key. Tries also allow association of a search key with an entire group of node keys that have a common prefix. However, when the set of node keys is sparse, for example when the actual node keys form a small subset of the set of potential keys, many of the internal nodes in the trie only have one descendant node. This gives the trie a high space occupancy.

The Patricia algorithm is a known algorithm which provides a flexible means of storing, indexing, and retrieving information in a large file, which is economical of index space and of reindexing time. It does not require rearrangement of text or indices as new material is added. The Patricia algorithm can be used to create and process Patricia tree data structures.

A Patricia tree, sometimes called a radix tree, is an example of a trie in which any node that is an only child is merged with its parent. Traversal of a conventional trie uses every part of the search key to determine which subtree to branch to, whereas by storing a search key part identifier, a Patricia tree nominates which element of the search key should be used next to determine the branching and hence which node should be traversed next. This removes the need for any nodes in the tree with just one descendant, so that only genuine branches are included in the index. This means that the index size is independent of the length of stored phrases.

The Patricia algorithm allows quick determination of whether a search key corresponds to a node key in the tree.

In the tree structure 215, each internal and leaf node is not only associated with a respective node key, as explained above, but is also associated with a respective node rank. In particular, the first node 221 is associated with a first node rank $r_1$ that is stored in a first node rank indicator 231, the second node 222 is associated with a second node rank $r_2$ that is stored in a second node rank indicator 232, the third node 223 is associated with a third node rank $r_3$ that is stored in a third node rank indicator 233, the fourth node 224 is associated with a fourth node rank $r_4$ that is stored in a fourth node rank indicator 234 and the fifth node 225 is associated with a fifth node rank $r_5$ that is stored in a fifth node rank indicator 235.

The node rank of a given node indicates its rank or importance in relation to other nodes in the tree data structure 215.

In some embodiments, a node may be explicitly associated with a node rank, for example by storing the node rank associated with the node in a node rank indicator. In other embodiments, a node may be implicitly associated with a node rank. For example, if only two different node ranks are assigned to nodes in the tree data structure 215, nodes that are associated with the higher of the two node ranks may have the higher node rank, or some other flag or value, stored in respective node rank indicators. Nodes that are associated with the lower of the two node ranks might not have a node rank stored in respective node rank indicators or may not even be associated with respective node rank indicators. In such cases, it can be inferred that the nodes having the node rank, flag or value in the node rank indicator are higher-ranked nodes and the nodes not having the node rank, flag or value in the node rank indicator.

The relevance of the node ranks can be seen in relation to the communication system 100 described above with reference to FIG. 1, in which traffic from certain subnets and/or specific computing devices should be handled in a particular manner. Although an example is provided below of possible node ranks that can be associated with different traffic-handling rules, it will be appreciated that these or other traffic-handling rules could be ordered differently amongst the node ranks. Furthermore, although only three node ranks are described in this example, it will be appreciated that there may be more or fewer node ranks.

In this example, the highest node rank relates to a "critical blacklist" status. Any traffic having a source IP address that has a prefix match with a node associated with the highest node rank is dropped immediately. This may be the case even if there is a longer prefix-match with the IP address in the tree data structure 215.

The middle node rank relates to a "whitelist" status. Any traffic having a source IP address which has a prefix match with a node associated with the middle node rank is processed, unless there is a longer prefix-match with a node having the highest node rank.

The lowest node rank relates to a "non-critical blacklist" status. Any traffic having a source IP address which has a prefix match with a node associated with the lowest node rank is processed at a low priority or may be dropped, for example depending on volume of traffic at the traffic handler 105.

Traffic having a source IP address which does not have a prefix match with any node in the tree data structure 215 is considered to be "untrusted", and is processed at a low priority; albeit a higher priority than traffic from traffic sources or subnets that are non-critically blacklisted.

Returning to FIG. 2, if traffic were received from computing device 104, the tree data structure 215 would be searched using the search key $k_s=IP_{104}$, which has a prefix of $k_1$ (the IP address associated with the second subnet 108). The tree data structure 215 would be traversed from the root node 220 to the first node 221, which is associated with node key $k_1$ and node rank $r_1$. Since the first node 221 is the only node that has a prefix match with the search key, it is the highest-ranked node in the tree data structure 215 that has a prefix match with the search key. The first node 221 would be selected as a preferred prefix-matching node in this case. Data associated with the first node 221 may be retrieved on the basis of the selection of the first node 221 as the preferred prefix-matching node. In the context of traffic handling, such data may comprise traffic handling information for traffic sources having an IP address in the first subnet 108 associated with the first node key, $k_1$, and the traffic from computing device 104 would be handled accordingly.

If traffic were received from computing device 103, the tree data structure 215 would be searched using the search key $k_s=IP_{103}$, which has prefixes of $k_2$ and $k_3$ (the IP addresses associated with the first subnet 107 and the second further subnet 110 respectively). The tree data structure 215 would be traversed from the root node 220 to the second node 222, which is associated with node key $k_2$ and node rank $r_2$ and then to the third node 223, which is associated with node key $k_3$ and node rank $r_3$ since both the second node 222 and the third node 223 have a prefix match with the search key. In this case, both the second node 222 and the third node 223 are prefix-matching nodes.

If the node rank, $r_2$, of the second node 222 is higher than the node rank, $r_3$, of the third node 223, then the higher-ranked node, the second node 222, is selected as the preferred prefix-matching node in preference to the lower-ranked node, the third node 223, even though the lower-ranked node, the third node 223, has a longer prefix match with the search key. Data associated with the second node 222 may be retrieved on the basis of the selection of the second node 222 as the preferred prefix-matching node. In the context of traffic handling, such data may comprise traffic handling information for traffic sources located in the first subnet 107 that is associated with the second node key, $k_2$, even though the third node 223 has a longer prefix match with the search key. In such cases, traffic from computing device 103 would be handled in accordance with (higher-ranked) traffic-handling rules associated with the first subnet 107, even though there is a (lower-ranked) specific traffic-handling rule for the second further subnet 110 in which computing device 103 is located.

For example the second node 222 may be associated with a traffic-handling rule that specifies that any traffic received from a traffic source in the first subnet 107 should be treated as being from a blacklisted traffic source and should be handled accordingly. The third node 223 may be associated with a traffic-handling rule that specifies that any traffic received from a traffic source in the second further subnet 110 should be treated as being from a whitelisted traffic source and should be handled accordingly. Since the node rank, $r_2$, associated with the second node 222 is higher than the node rank, $r_3$, associated with the third node 223, the traffic from computing device 103 would be handled according to blacklisted traffic handling rules, notwithstanding the longer prefix match with the third node 223.

If the node rank, $r_2$, of the second node 222 is the same as, or is less than, the node rank, $r_3$, of the third node 223, then the third node 223 is selected as the preferred prefix-matching node on the basis that it is a longer prefix-matching node and has a higher node rank, $r_3$, than the second node 222. Data associated with the third node 223 may be retrieved on the basis of the selection of the third node 223 as the preferred prefix-matching node. In the context of traffic handling, such data may comprise traffic handling information for traffic sources having an IP address in the second further subnet 110 associated with the third node key, $k_3$, and the traffic from computing device 103 would be handled accordingly.

Using the same example, the second node 222 may be associated with a traffic-handling rule that specifies that any traffic received from a traffic source in the first subnet 107 should be treated as being from a blacklisted traffic source and should be handled accordingly. The third node 223 may be associated with a traffic-handling rule that specifies that any traffic received from a traffic source in the second further subnet 110 should be treated as being from a whitelisted traffic source and should be handled accordingly. Since the node rank, $r_2$, associated with the second node 222 is not higher than the node rank, $r_3$, associated with the third node 223, the traffic from computing device 103 would be handled according to whitelisted traffic handling rules, since there is a longer prefix match with the third node 223 and the node rank, $r_2$, associated with the second node 222 is not higher than the node rank, $r_3$, associated with the third node 223.

If traffic were received from computing device 102, the tree data structure 215 would be searched using the search key $k_s=IP_{102}$, which has prefix matches with $k_2$ and $k_4$ (the IP address associated with the first subnet 107 and the first further subnet 109 respectively). The tree data structure 215 would be traversed from the root node 220 to the second node 222, which is associated with node key $k_2$ and node rank $r_2$ and then to the fourth node 224, which is associated with node key $k_4$ and node rank $r_4$. In this case, both the second node 222 and the fourth node 224 are prefix-matching nodes.

If the node rank, $r_2$, of the second node 222 is higher than the node rank, $r_4$, of the fourth node 224, then the higher-ranked node, the second node 222, is selected as the preferred prefix-matching node in preference to the lower-ranked node, the fourth node 224, even though the lower-ranked node, the fourth node 224, has a longer prefix match with the search key. Data associated with the second node 222 may be retrieved on the basis of the selection of the second node 222 as the preferred prefix-matching node. In the context of traffic handling, such data may comprise traffic handling information for traffic sources located in the first subnet 107 that is associated with the second node key, $k_2$, even though the fourth node 224 has a longer prefix match with the search key. In such cases, traffic from computing device 102 would be handled in accordance with (higher-ranked) traffic-handling rules associated with the first subnet 107, even though there is a (lower-ranked) specific traffic-handling rule for the first further subnet 109 in which computing device 102 is located.

If the node rank, $r_2$, of the second node 222 is the same as, or is less than, the node rank, $r_4$, of the fourth node 224, then the fourth node 224 is selected as the preferred prefix-matching node on the basis that it is a longer prefix-matching node and has a higher node rank, $r_4$, than the second node 222. Data associated with the fourth node 224 may be retrieved on the basis of the selection of the fourth node 224 as the preferred prefix-matching node. In the context of traffic handling, such data may comprise traffic handling information for traffic sources having an IP address in the first further subnet 109 associated with the fourth node key, $k_4$, and the traffic from computing device 102 would be handled accordingly.

If traffic were received from computing device 101, the tree data structure 215 would be searched using the search key $k_s=IP_{101}$, which is has prefix matches with $k_2$, $k_4$ and $k_5$ (the IP addresses associated with the first subnet 107, the first further subnet 109 and computing device 101 itself, respectively). The tree data structure 215 would be traversed from the root node 220 to the second node 222, which is associated with node key $k_2$ and node rank $r_2$, then to the fourth node 224 which is associated with node key $k_4$ and node rank $r_4$, and then to the fifth node 225, which is associated with node key $k_5$ and node rank $r_5$. In this case, the second node 222, the fourth node 224 and the fifth node 225 are prefix-matching nodes.

If the node rank, $r_2$, of the second node 222 is greater than the node ranks, $r_4$ and $r_5$, of the fourth and fifth nodes 224, 225 respectively, then the higher-ranked node, the second node 222, is selected as the preferred prefix-matching node in preference to the lower-ranked nodes, the fourth and fifth nodes 224, 225, even though the lower-ranked nodes, the fourth and fifth nodes 224, 225, both have a longer prefix match with the search key. Data associated with the second node 222 may be retrieved on the basis of the selection of the second node 222 as the preferred prefix-matching node. In the context of traffic handling, such data may comprise traffic handling information for traffic sources located in the first subnet 107 that is associated with the second node key, $k_2$, even though the fourth and fifth nodes 224, 225 both have longer prefix matches with the search key. In such cases, traffic from computing device 101 would be handled in accordance with (higher-ranked) traffic-handling rules associated with the first subnet 107, even though there are (lower-ranked) specific traffic-handling rules for the first further subnet 107 in which computing device 101 is located and specific traffic-handling rules for computing device 101 itself.

If the node rank, $r_2$, of the second node 222 is the same as, or is less than, the node ranks, $r_4$ and $r_5$, of the fourth and fifth nodes 224, 225, then the higher-ranked of the fourth and fifth nodes 224, 225 is selected as a preferred prefix-matching node on the basis that it is a longer prefix-matching node and has a higher node rank than the second node 222.

Thus, even though, for example, the fifth node 225 has a longer prefix match with the search key than the second and fourth nodes 222, 224, the second or fourth node 222, 224 may be selected as a preferred prefix-matching node if it is a higher-ranked node than the fifth node 225.

If the tree data structure 215 were searched using the search key $k_s=IP_x$, where $IP_x$ is the IP address of a computing device (not shown) that is located in the network 106, but outside both the first and second subnets 107, 108, no prefix match would be found in the tree data structure 215. In such cases, predetermined data associated with a null search result may be retrieved. In the context of traffic handling, such data may comprise default traffic-handling information for traffic sources not having specific traffic handling information.

Figure 3:
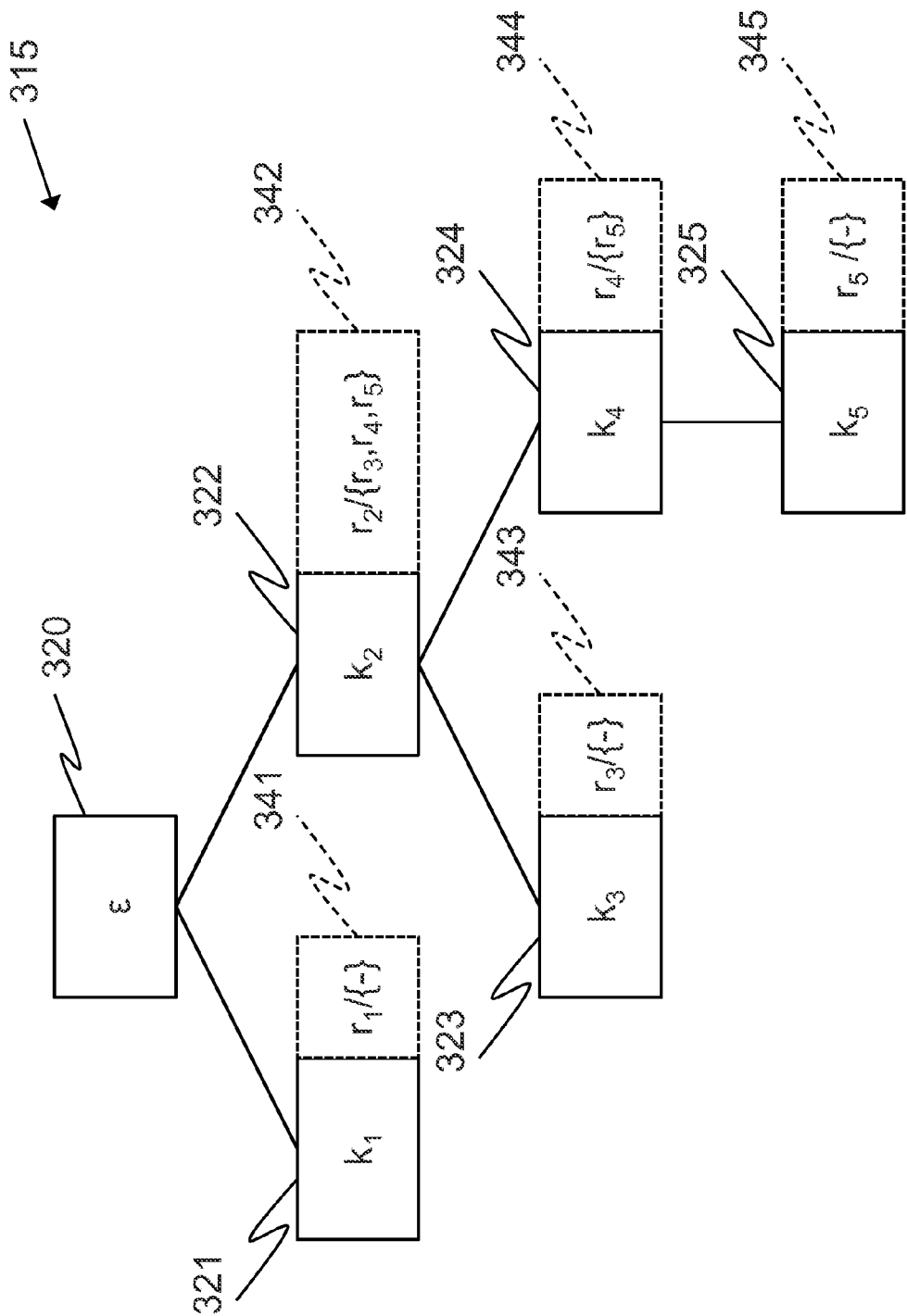
FIG. 3 is a schematic representation of a tree data structure.

FIG. 3 is a schematic representation of a tree data structure 315.

The tree data structure 315 shown in FIG. 3 is similar to the tree data structure 215 shown in FIG. 2. Similar elements in FIG. 3 are shown with corresponding reference numerals to those shown in FIG. 2, but incremented by 100.

However, in addition to a node being associated with a node rank of the node itself, it is also associated with a respective dependant node rank identifier; the first node 321 is associated with a first dependant node rank identifier 341, the second node 322 is associated with a second dependant node rank identifier 342, the third node 323 is associated with a third dependant node rank identifier 343, the fourth node 324 is associated with a fourth dependant node rank identifier 344 and the fifth node 325 is associated with a fifth dependant node rank identifier 345.

The dependant node rank identifiers indicate the node ranks associated with dependant nodes of the node with which they are associated, which may have longer prefix matches with a given search key.

For example, the second node 322 is associated with node rank $r_2$ and has three dependant nodes; the third node 323 which is associated with node rank $r_3$, the fourth node 324 which is associated with node rank $r_4$ and the fifth node 325 which is associated with node rank $r_5$. The dependant node rank identifier 342 associated with the second node 322, thus, indicates the node ranks of each of its dependant nodes.

If, for example, traffic were received from computing device 101, the tree data structure 315 would be searched using the search key $k_s=IP_{101}$ (the IP address associated computing device 101 itself). The tree data structure 315 would be traversed from the root node 320 to the second node 322, which is associated with node key $k_2$ and node rank $r_2$. The second node 322 is a prefix-matching node. The dependant node rank identifier 342 associated with the second node 322 indicates that the dependant nodes of the second node 322 are associated with node ranks $r_3$, $r_4$ and $r_5$.

If the node rank, $r_2$, associated with the second node 322, is higher than all of the node ranks $r_3$, $r_4$ and $r_5$ associated with the dependant nodes of the second node 322, then it can be determined that none of the dependant nodes of the second node 322 is a higher-ranked node than the second node 322. The second node 322 can, therefore, be selected as a preferred prefix-matching node. In such cases, it is not necessary to determine whether or not the dependant nodes of the second node 322 do, in fact, have longer prefix matches with the search key than the second node 322. This is because, even if the dependant nodes of the second node 322 have longer prefix matches with the search key than the second node 322, none of them is associated with a higher node rank than the node rank, $r_2$, of the second node 322.

If the node rank, $r_2$, associated with the second node 322, is the same as or is lower than at least some of the node ranks $r_3$, $r_4$ and $r_5$ associated with the dependant nodes of the second node 322, searching proceeds to determine whether or not there is a longer prefix-matching node and, if so, whether the longer-prefix matching node is associated with a node rank that is higher than or is the same as the node rank, $r_2$, associated with the second node 322.

If there is a longer prefix-matching node associated with a node rank that is the same as or is higher than the node rank, $r_2$, associated with the second node 322, then that node may be selected as a preferred prefix-matching node in preference to the second node 322. If there is no longer prefix-matching node, or if there is one or more longer prefix-matching nodes associated with node ranks that are lower than the node rank, $r_2$, associated with the second node 322, then the second node 322 is selected as a preferred prefix-matching node in preference to the node having the longer prefix-match.

Figure 4:
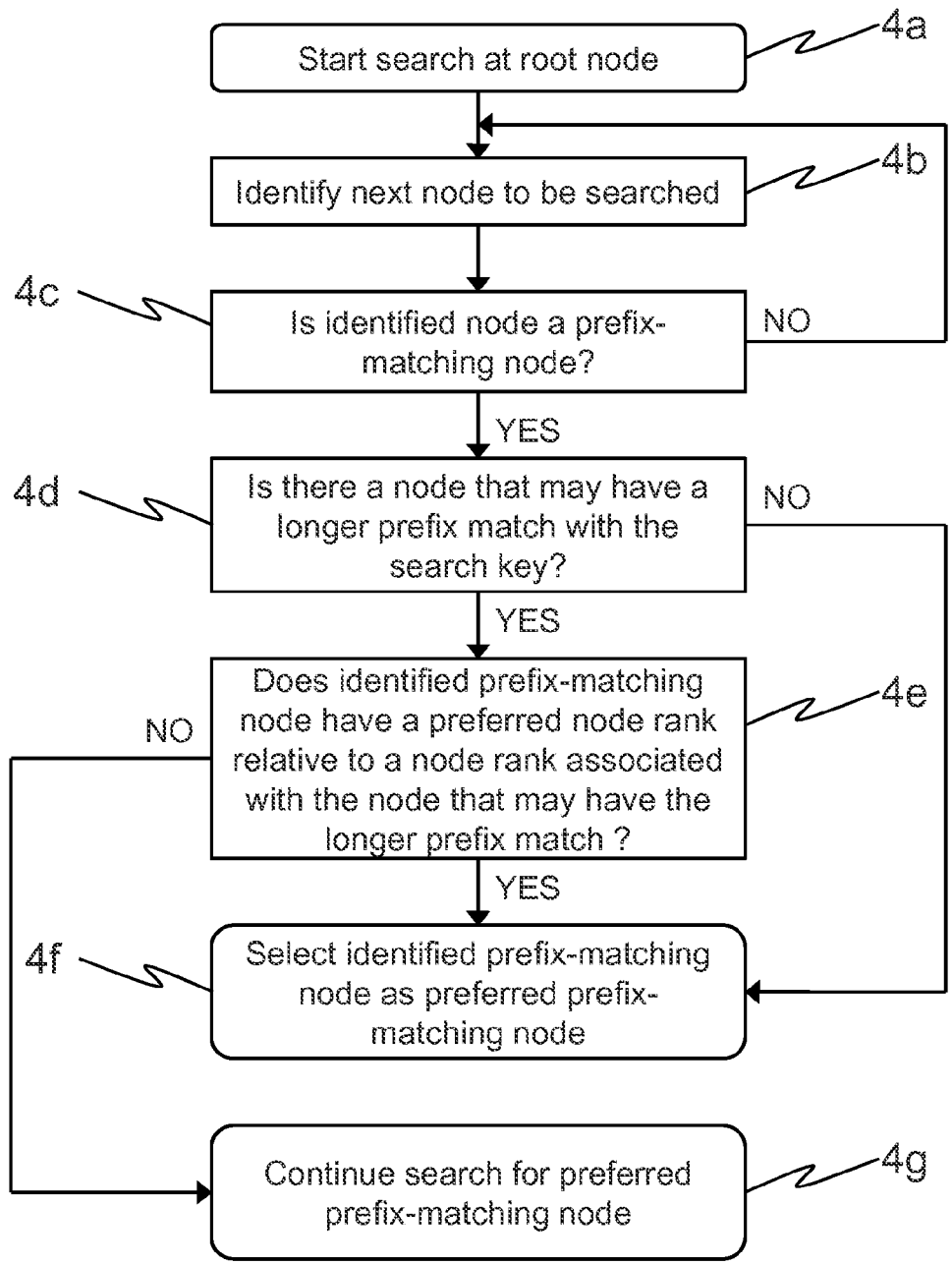
FIG. 4 is a flowchart representing a method of searching a database.

FIG. 4 is a flowchart showing a method of searching a database using a search key, the database containing data stored in a tree data structure. Reference is made to the tree structures 215, 315 shown in FIGS. 2 and 3 respectively.

At step 4a, the search is started at the root node 220, 320.

At step 4b, the next node to be searched is identified.

Once the node to be searched has been identified, the search continues to step 4c in which a determination is made as to whether or not the identified node has a prefix match with the search key.

If the identified node is not a prefix-matching node, then the search returns to step 4b, where another node that may have a prefix match with the search key is identified. This may continue until all possible nodes that may have a match with the search key have been considered. If no node has a match with the search key, then the search may conclude with a corresponding result.

If the identified node is a prefix-matching node, then the search continues to step 4d, in which it is determined whether or not there is a node that may have a longer prefix match with the search key.

If, at step 4d, it is determined that there is or may be a node that may have a longer prefix match with the search key, then searching proceeds to step 4e, at which it is determined whether the prefix-matching node has a preferred node rank relative to a node rank of the node that may have the longer prefix match with the search key. Such a determination may be made by comparing the node rank associated with the identified prefix-matching node with the node rank associated with the node that may have the longer prefix match with the search key. Such comparison may be by using a dependant node rank identifier associated with the identified prefix-matching node if it is associated with such an identifier.

If the determination at step 4e is that the identified prefix-matching node does have a preferred node rank relative to the node rank associated with the node that may have the longer prefix match with the search key, then the identified prefix-matching is selected as the preferred prefix-matching node at step 4f.

Similarly, if at step 4d, it is determined that there not a node that may have a longer prefix match with the search key, then the identified prefix-matching is selected as the preferred prefix-matching node at step 4f.

If the determination at step 4e is that the identified prefix-matching node does not have a preferred node rank relative to the node rank associated with the node that may have the longer prefix match with the search key, then the search continues for a preferred prefix-matching node at step 4g.

Figure 5:
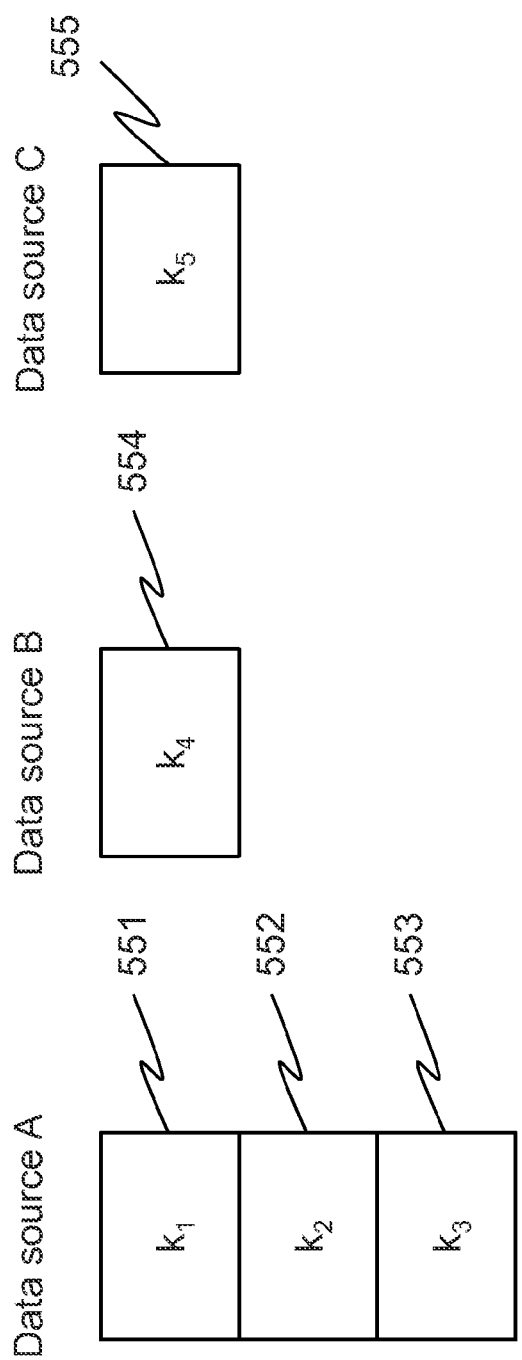
FIG. 5 is a schematic representation of a plurality of data sources containing data.

FIG. 5 is a schematic representation of a plurality of data sources containing data.

As shown in FIG. 5, a first data source, labelled in FIG. 5 and referred to herein as data source A, includes first, second and third data items 551, 552, 553. The first data item 551 is $k_1$ which is associated with the IP address of the second subnet 108. The second data item 552 is $k_2$, which is associated with the IP address of the first subnet 107. The third data item 553 is $k_3$ which is associated with the IP address of the second further subnet 110.

A second data source, labelled in FIG. 5 and referred to herein as data source B, includes a fourth data item 554. The fourth data item 554 is $k_4$ which is associated with the IP address of the first further subnet 109.

A third data source, labelled in FIG. 4 and referred to herein as data source C, includes a fifth data item 555. The fifth data item 555 is $k_5$ which is associated with the IP address, $IP_{101}$, of computing device 101.

Each of the data sources A, B, C is associated with a respective data source rank; data source A is associated with data source rank A, data source B is associated with data source rank B and data source C is associated with data source rank C. For example, data source A may identify traffic sources or subnets from which traffic should be treated as being from a blacklisted traffic source and may be associated with the highest rank. Data source B may identify traffic sources or subnets from which traffic should be treated as being from a whitelisted traffic source and may be associated with a medium rank. Data source C may identify traffic sources or subnets from which traffic should be treated as being from a non-critically blacklisted traffic source and may be associated with a low rank.

Figure 6:
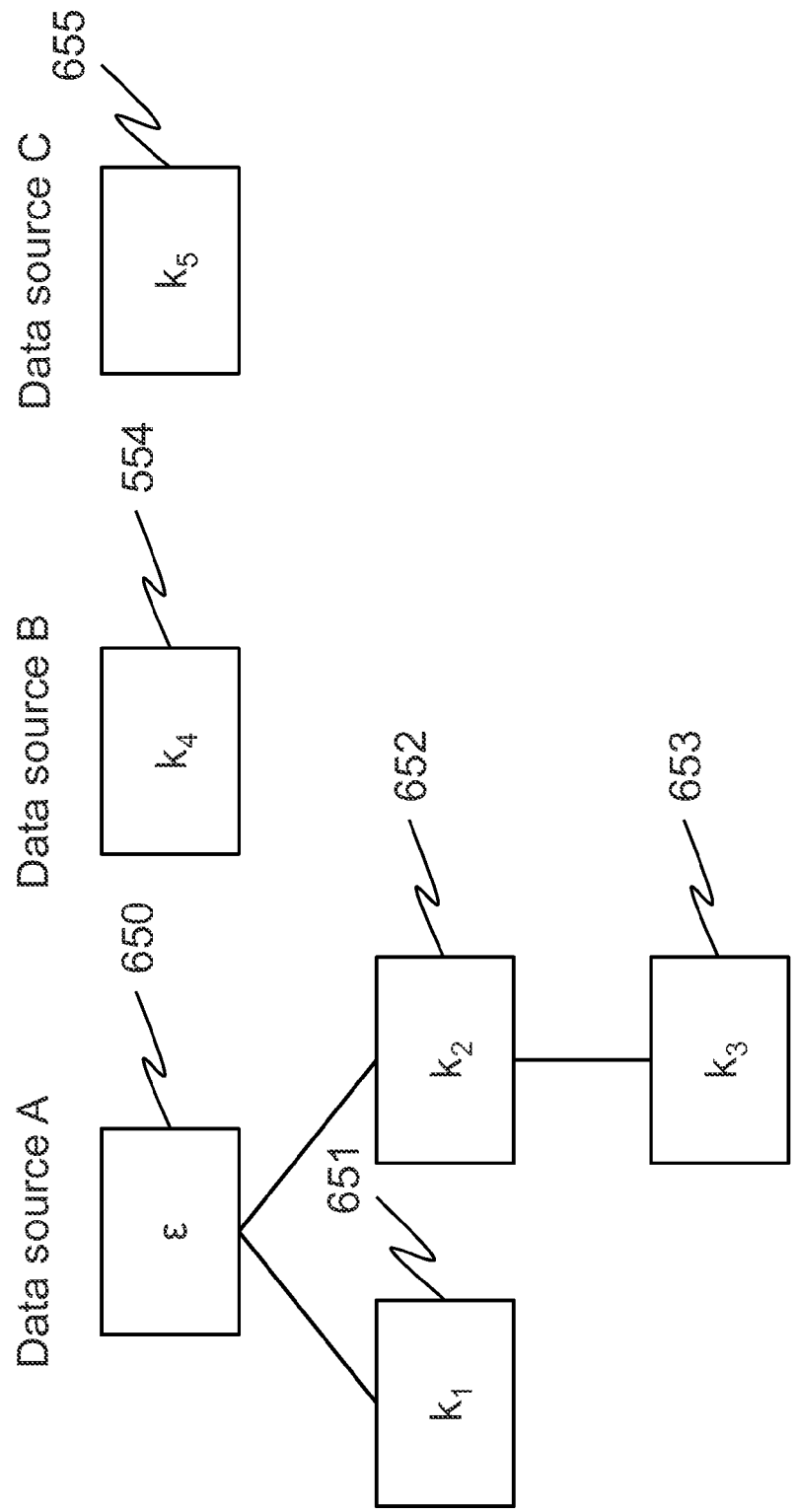
FIG. 6 is a schematic representation of a plurality of data sources containing data, at least one of the data sources containing data in a tree data structure.

FIG. 6 is a schematic representation of a plurality of data sources, at least one of the data sources containing data in a tree data structure.

FIG. 6 is similar to FIG. 5 in that each of the data sources A, B and C includes the same data items 651, 652, 653, 654, 655 as explained above in relation to FIG. 5.

Elements in FIG. 6 that are similar to those in FIG. 5 are shown using the same reference number, but incremented by 100.

However, at least data items 651, 652 and 653 are stored in data source A in a tree data structure. In particular, data item $k_1$ is associated with a left child node 651 of a root node 650, data item $k_2$ is associated with a right child node 652 of the root node 650, and data item $k_3$ is associated with an only child node 653 of the right child node 652 associated with data item $k_2$. Data items 654 and 655 may also be stored in respective tree data structures, each having only one node.

FIGS. 7A to 7E show a method of storing data in a tree data structure. In particular, FIGS. 7A to 7E show, schematically, merging of the data items from the plurality of data sources shown in, and described in relation to, FIGS. 5 and 6 into a merged tree data structure 715.

The data items from the data sources A, B, C are compared to determine how to arrange the nodes into the merged or combined tree data structure 715.

Figure 7A:
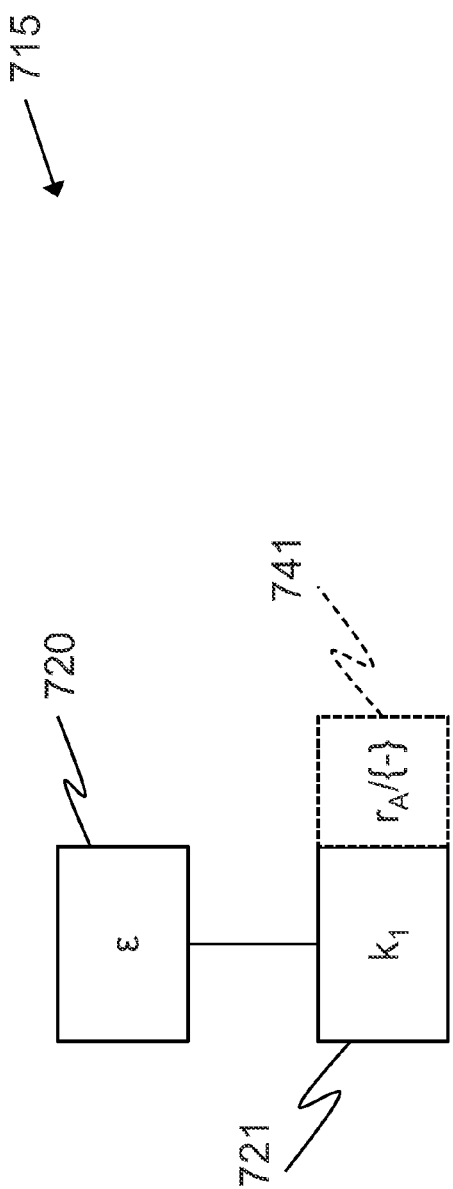
FIGS. 7A to 7E show a method of storing data in a tree data structure.

Data item $k_1$ from data source A does not share a common prefix with any of the other data items and is added as a first node 721 in the merged tree data structure 715 as a child node of the root node 720, as shown in FIG. 7A. The first node 721 associated with data item $k_1$ is associated with node rank $r_A$, which identifies that it originates from data source A. Since the first node 721 does not have any dependant nodes, either no dependant node rank identifier is associated with the first node 721, or a first dependant node rank identifier 741 is associated with the first node 721 but indicates that the first node 721 does not have any child nodes.

Figure 7B:
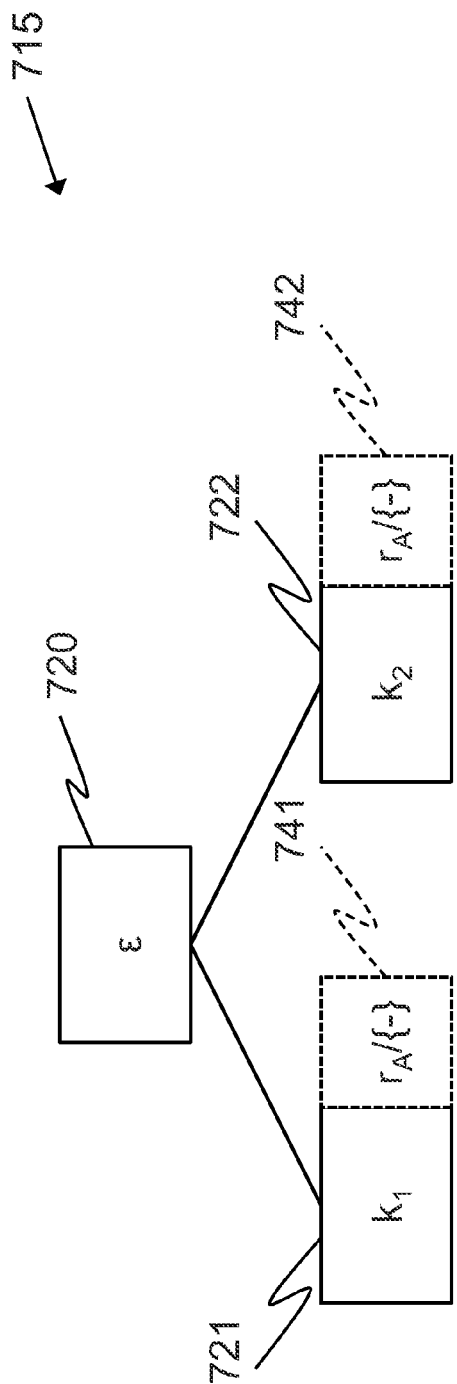

Data item $k_2$ from data source A shares a common prefix with data items $k_3$, $k_4$ and $k_5$ and is added as a second node 722 in the merged tree data structure 715 as a child node of the root node 720, as shown in FIG. 7B. The second node 721 associated with data item $k_2$ is also associated with node rank $r_A$, which identifies that it originates from data source A. Since the second node 722 does not have any dependant nodes, either no dependant node rank identifier is associated with the second node 722, or a second dependant node rank identifier 742 is associated with the second node 722 but indicates that the second node 722 does not have any child nodes.

Figure 7C:
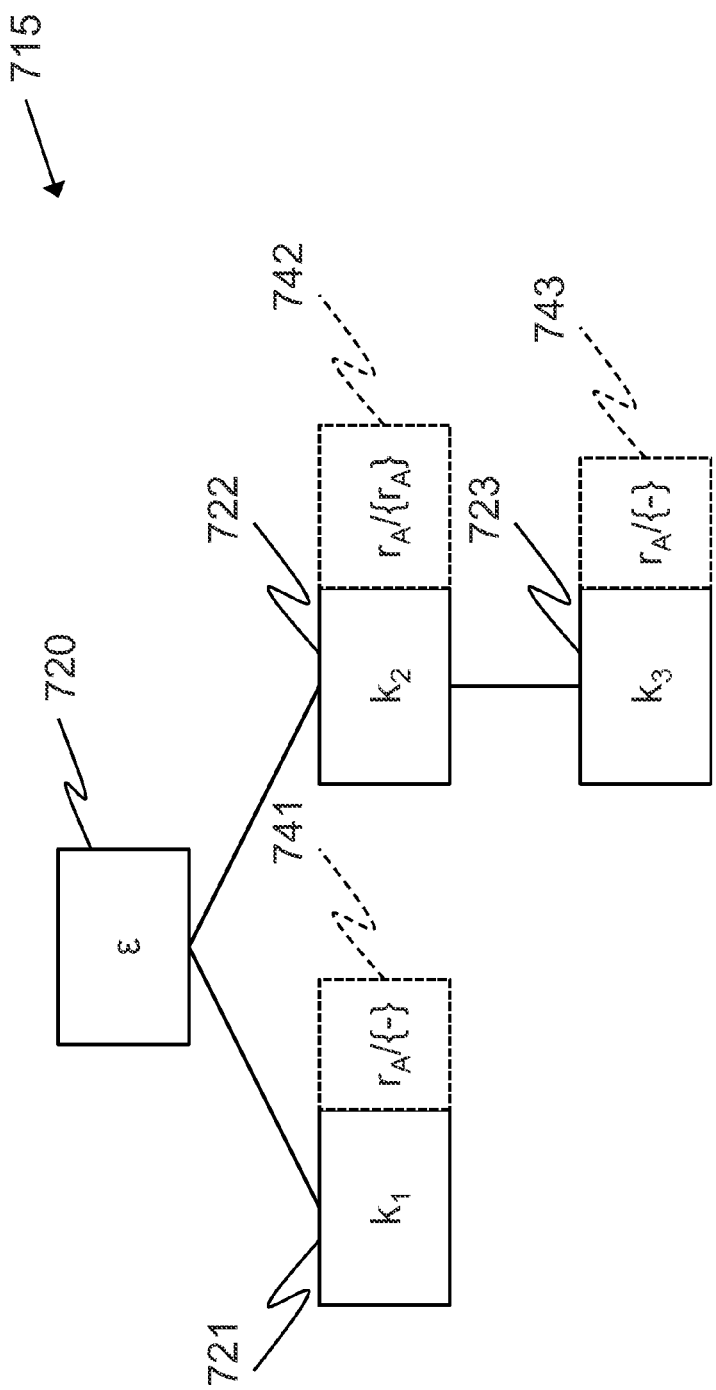

Data item $k_3$ from data source A shares a common prefix with data item $k_2$ which is already associated with the second node 722 in the merged tree data structure 715. Data item part $k_3$ is added as a third node 723 in the merged tree data structure 715 as a child node of the second node 722, as shown in FIG. 7C. The third node 723 associated with data item $k_3$ is also associated with node rank $r_A$, which identifies that it originates from data source A. Since the third node 723 does not have any dependant nodes, either no dependant node rank identifier is associated with the third node 723, or a third dependant node rank identifier 743 is associated with the third node 723 but indicates that the third node 723 does not have any child nodes. However, since the third node 723 is added as a child node of the second node 722, the second dependant node rank identifier 742 associated with the second node 722 is updated to indicate the node rank of the third node 723, namely node rank $r_A$. Thus, the second dependant node rank identifier 742 associated with the second node 722 indicates both that the node rank associated with the second node 722 is node rank $r_A$ and that the node rank of its child node is (also) node rank $r_A$.

Figure 7D:
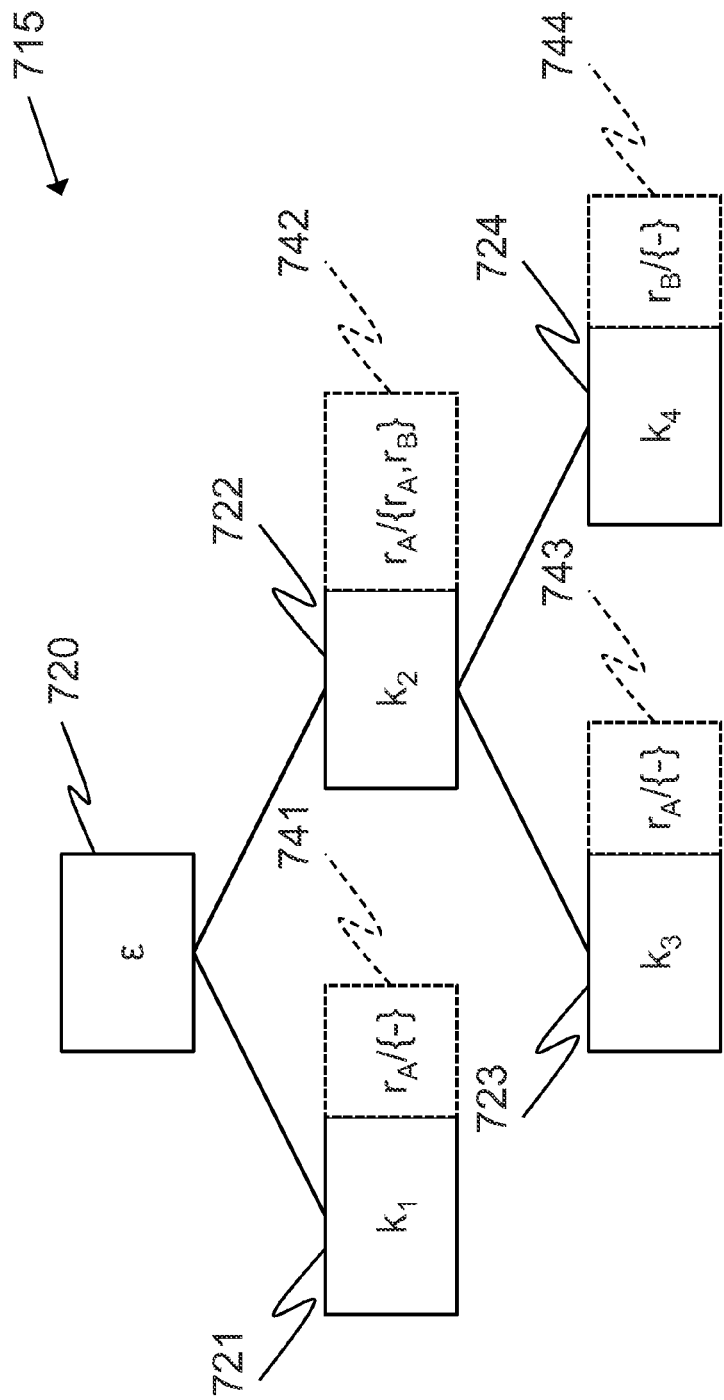

Data item $k_4$ from data source B shares a common prefix with data item $k_2$ which is already associated with the second node 722 in the merged tree data structure 715. Data item part $k_4$ is added as a fourth node 724 in the merged tree data structure 715 as a child node of the second node 722, as shown in FIG. 7D. The fourth node 724 associated with data item $k_4$ is associated with node rank $r_B$, which identifies that it originates from data source B. Since the fourth node 724 does not have any dependant nodes, either no dependant node rank identifier is associated with the fourth node 724, or a fourth dependant node rank identifier 744 is associated with the fourth node 724 but indicates that the fourth node 724 does not have any child nodes. However, since the fourth node 724 is added as a (second) child node of the second node 722, the second dependant node rank identifier 742 associated with the second node 722 is updated to indicate the node rank of the fourth node 724, namely node rank $r_B$. Thus, the second dependant node rank identifier 724 associated with the second node 722 indicates that the node rank associated with the second node 722 is node rank $r_A$ and that the node ranks of its child nodes are node ranks $r_A$ and $r_B$.

Figure 7E:
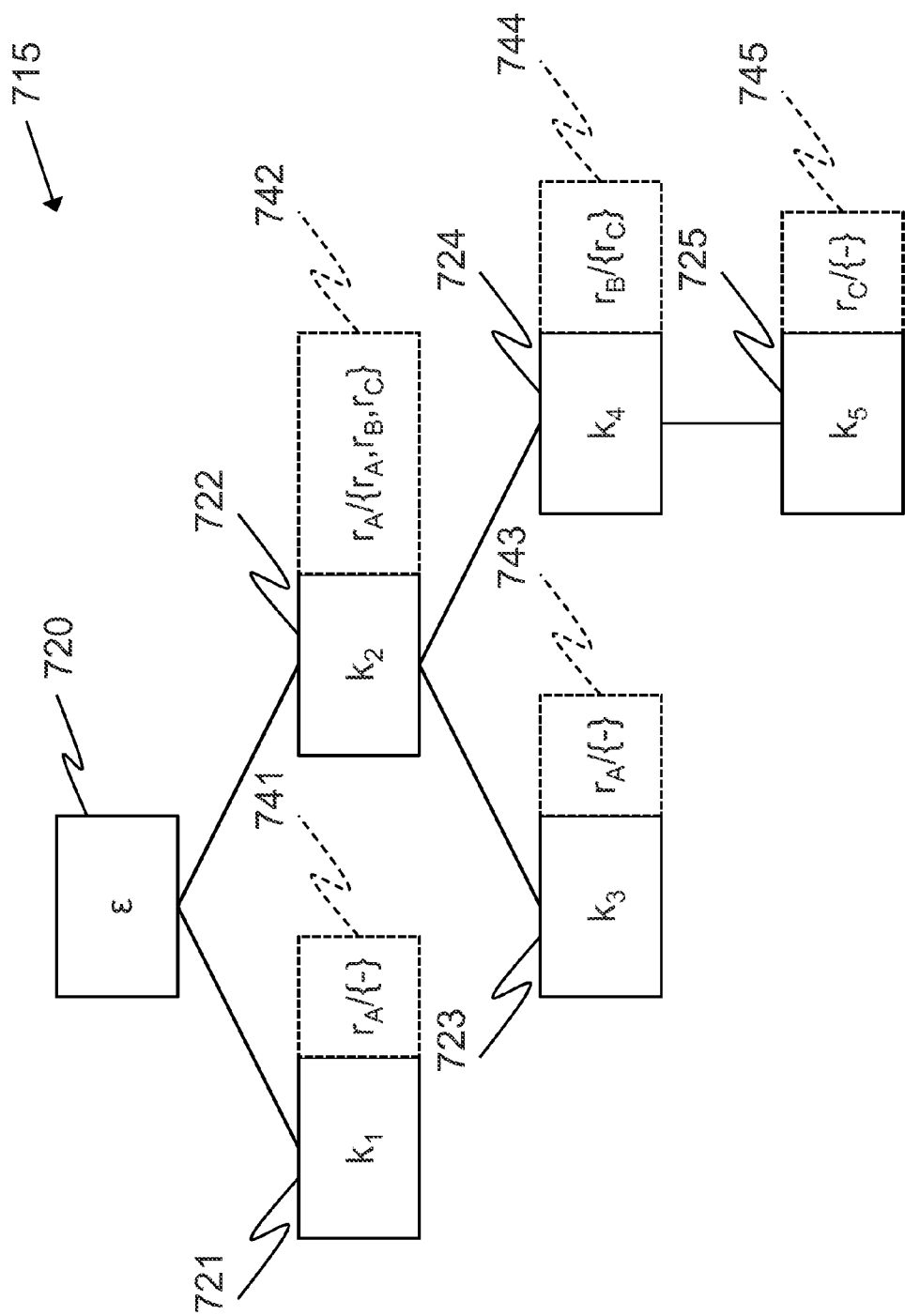

Data item $k_5$ from data source C shares a common prefix with data item $k_4$ which is already associated with the fourth node 744 in the merged tree data structure 715. Data item part $k_5$ is added as a fifth node 725 in the merged tree data structure 715 as a child node of the fourth node 724, as shown in FIG. 7E. The fifth node 725 associated with data item $k_5$ is associated with node rank $r_C$, which identifies that it originates from data source C. Since the fifth node 725 does not have any dependant nodes, either no dependant node rank identifier is associated with the fifth node 725, or a fifth dependant node rank identifier 745 is associated with the fifth node 725 but indicates that the fifth node 725 does not have any child nodes. However, since the fifth node 725 is added as a child node of the fourth node 724, the fourth dependant node rank identifier 744 associated with the fourth node 724 is updated to indicate the node rank of the fifth node 725, namely node rank $r_C$. Thus, the fourth dependant node rank identifier 744 associated with the fourth node 724 indicates that the node rank associated with the fourth node 724 is node rank $r_B$ and that the node rank of its child node is node rank $r_C$. Furthermore, since the fifth node 725 is added as a grandchild node of the second node 722, the second dependant node rank identifier 742 associated with the second node 722 is updated to indicate the node rank of the fifth node 725, namely node rank $r_C$. Thus, the second dependant node rank identifier 742 associated with the second node 722 indicates that the node rank associated with the second node 722 is node rank $r_A$ and that the node rank of its dependant nodes are node ranks $r_A$ (associated with the third node 723), $r_B$ (associated with the fourth node 724) and $r_C$ (associated with the fifth node 725).

By way of an example, and with references to FIGS. 5 and 6, data source A may be used to identify traffic sources and/or subnets from which traffic should be handled using blacklisted traffic-handling rules, data source B may be used to identify traffic sources and/or subnets from which traffic should be handled using whitelisted traffic-handling rules and data source C may be used to identify traffic sources and/or subnets from which traffic should be handled using non-critically blacklisted traffic-handling rules. The relative ranks $r_A$, $r_B$ and $r_C$ may be selected to determine how traffic is handled based on ranked traffic-handling rules. For example, if incoming traffic is received from computing device 101 and node rank $r_B$ is higher than both of $r_A$ and $r_C$, then the traffic from computing device 101 would be treated as being from a whitelisted source even though there is a prefix match with the second node 722 and a longer prefix match with the fifth node 725.

If it were desired to blacklist computing device 101, an additional node rank, $r_A$, could be associated with the fifth node 755. This may be as a result of determining that the traffic source 101 is a malicious or potentially malicious traffic source. For example, computing device 101 could be identified in data source A, which is associated with blacklisted traffic handling. If traffic were received from computing device 101, then both the second node 742 and the fifth node 755, which are both associated with the highest rank, $r_A$, would be highest-ranking nodes having a prefix match with the search key. In such a case, the traffic from computing device 101 would be handled using blacklisted traffic-handling rules.

In general, it may sometimes be desirable to add further keys to the merged tree data structure 715. For example, it may be desired to blacklist a particular traffic source or subnet in view of potentially malicious activity in relation to the traffic source or subnet, a new key associated with the IP address of the traffic source or subnet can be added to the tree data structure 715.

Further keys may be added directly to the merged tree data structure 715 or may be added to an existing data source A, B, C or to a new data source, which addition is then updated in the merged tree data structure 715.

A key may be added to a tree data structure 715 such as is shown in FIGS. 7A to 7E as follows. Given a key to be added to the tree data structure 715, the tree data structure 715 is searched for the given key.

If the given key is already associated with an existing node in the tree data structure 715, the existing node is associated with a further node rank associated with the given key (which may relate to the data source rank of the particular data source from which the given key originates). Dependant node rank identifiers of any ancestor nodes of the existing node are updated, where necessary, to indicate the newly added node rank of the existing node.

If the given key is not associated with an existing node in the tree data structure, the key is added to a new node and the new node is associated with a node rank (which may relate to the data source rank of the particular data source from which the given key originates). A dependant node rank identifier associated with the new node is updated, if necessary, to indicate the node ranks of any dependant nodes of the new node, if any exist. Dependant node rank identifiers of any ancestor nodes of the new node are updated, where necessary, to indicate the newly added node rank of the new node.

In some situations, it may be desirable to delete an existing key in the merged tree data structure 715. For example, it may be desired to remove the blacklisting of a particular traffic source or subnet in relation to which potentially malicious activity was previously detected.

A node key may also be deleted from a tree data structure 715 such as is shown in FIGS. 7A to 7E as follows. Given a key and an associated node rank to be removed from the tree data structure 715, the tree data structure 715 is searched for the given key.

A node is identified that is associated with the given key and is also associated with the node rank. The association of the node rank with the identified node is removed. The tree data structure 715 is then ascended towards the root node 720. Each node along the ascending path is checked to see whether it is associated with a dependant node rank identifier which indicates the node rank that has just been removed. If the dependant node rank identifier indicates the node rank that has just been removed and the checked node has no other dependant nodes that are associated with the same node rank, the indication of the node rank in the dependant node rank identifier is removed.

In some cases, it may be desirable to change the node rank associated with a given node. For example, a node may be associated with a traffic source or subnet that was previously subject to blacklisted traffic handling. If traffic from that subnet should subsequently be handled according to, for example, whitelisted traffic handling, then the node rank associated with the given node can be changed. This may necessitate updating of dependant node rank identifiers associated with any ancestor nodes in view of the changed node rank of the given node.

As such, the node rank associated with a given node may be dynamically varied, for example based on at least one condition related to the network 106, the traffic handler 105, the backend server 111 or on another factor.

In the embodiments described above, all of the internal and leaf nodes are associated with a respective node rank. However, not all of the internal and/or leaf nodes need be associated with a respective node rank.

For example, with reference to FIGS. 5 and 6, if the key $k_2$ associated with the IP address of the first subnet 107 were not stored in data source A and the first subnet 107 were not itself associated with a rank or specific traffic-handling rules, then the tree data structure 715 shown in FIG. 7E may not include a node rank associated with the second node 722 which is associated with the second node key, $k_2$. If the second node 722 were not added in the tree data structure 715, then the root node 720 may have three child nodes, corresponding to node keys $k_1$, $k_3$ and $k_4$. The second node 722 may, therefore, be added so as to control the maximum number of child nodes of the root node 720. In such cases, searching the tree data structure 715 using a search key associated with a computing device in the first subnet 107 that is not in either of the first and second further subnets 109, 110 would not find a prefix match in the tree data structure 715.

In another example, the node rank associated with a given node may be removed even though the given node itself remains in the tree data structure 715. For example, the node key, $k_2$, could initially be stored in the first data source A to indicate that all traffic from sources located in the first subnet 107 should be handled according to a given traffic-handling rule. If it is determined that traffic from such sources should no longer be handled according to the given traffic-handling rule, the node rank associated with the second node 722 could be removed.

Although various embodiments described above relate to the use of tree data structures 215, 315, 715 in the context of traffic handling in a communication system 100, the methods and apparatus described herein have additional uses, for example in the context of linguistic searching.

Figure 8A:
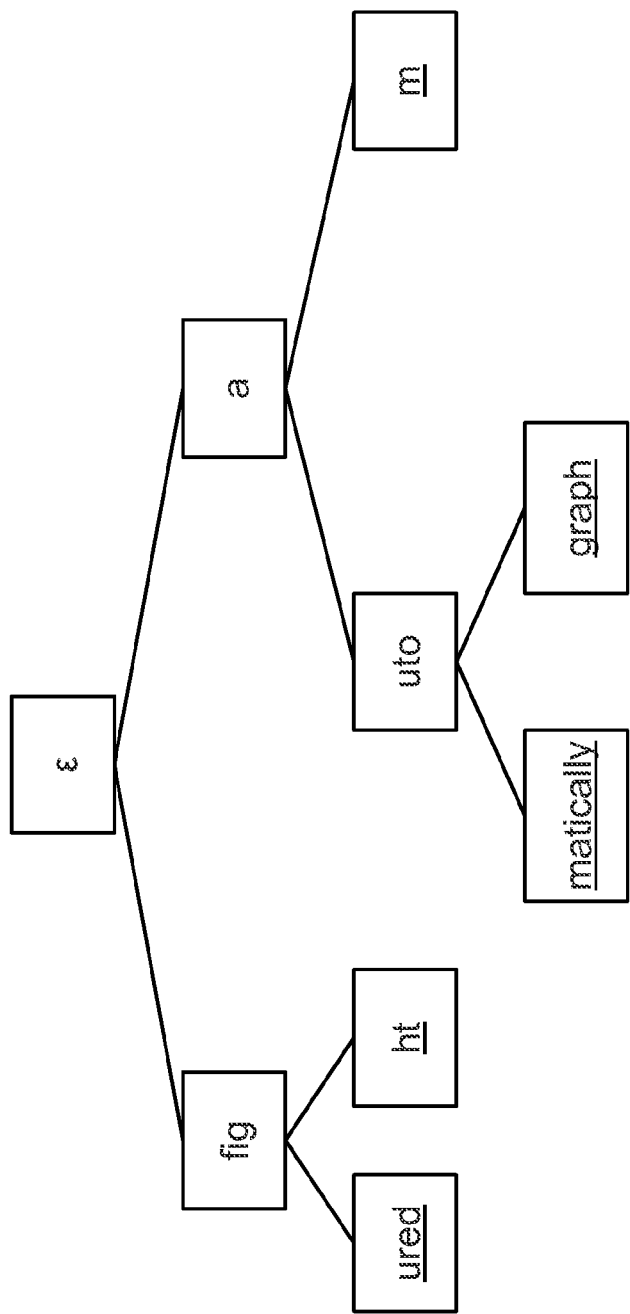
FIGS. 8A to 8C are schematic representations of first, second and third tree data structures.
Figure 8B:
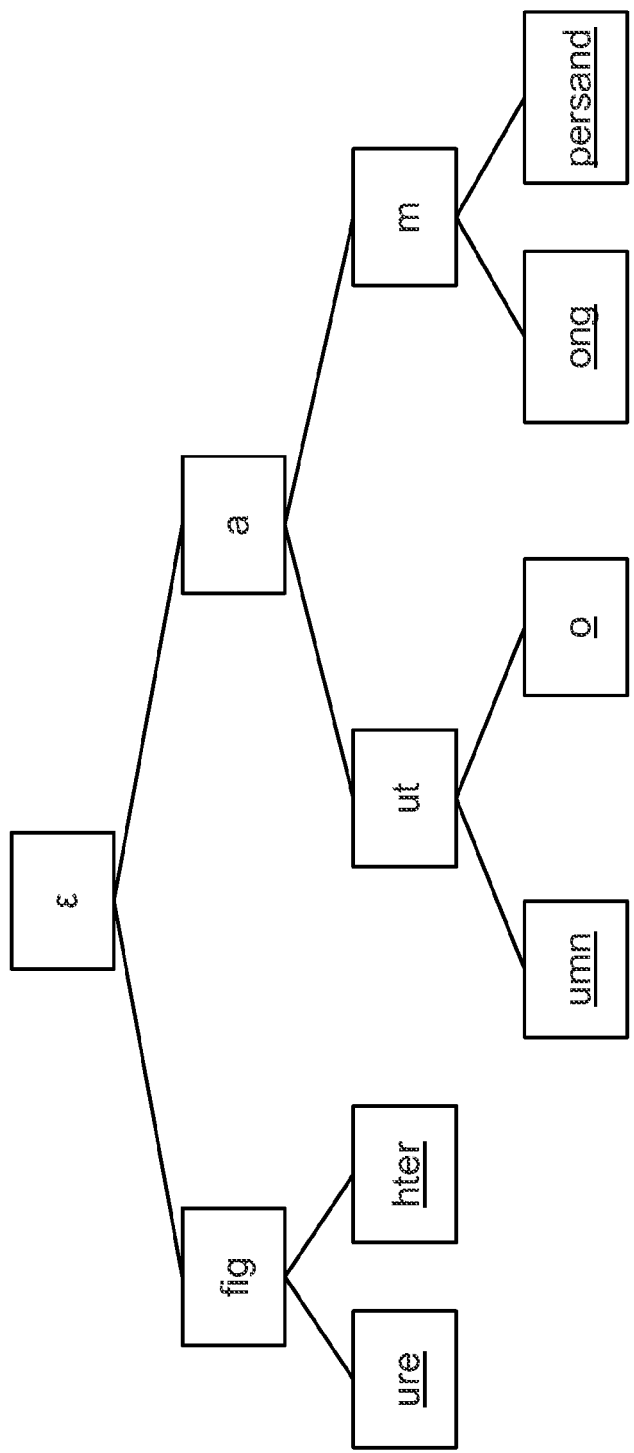
Figure 8C:
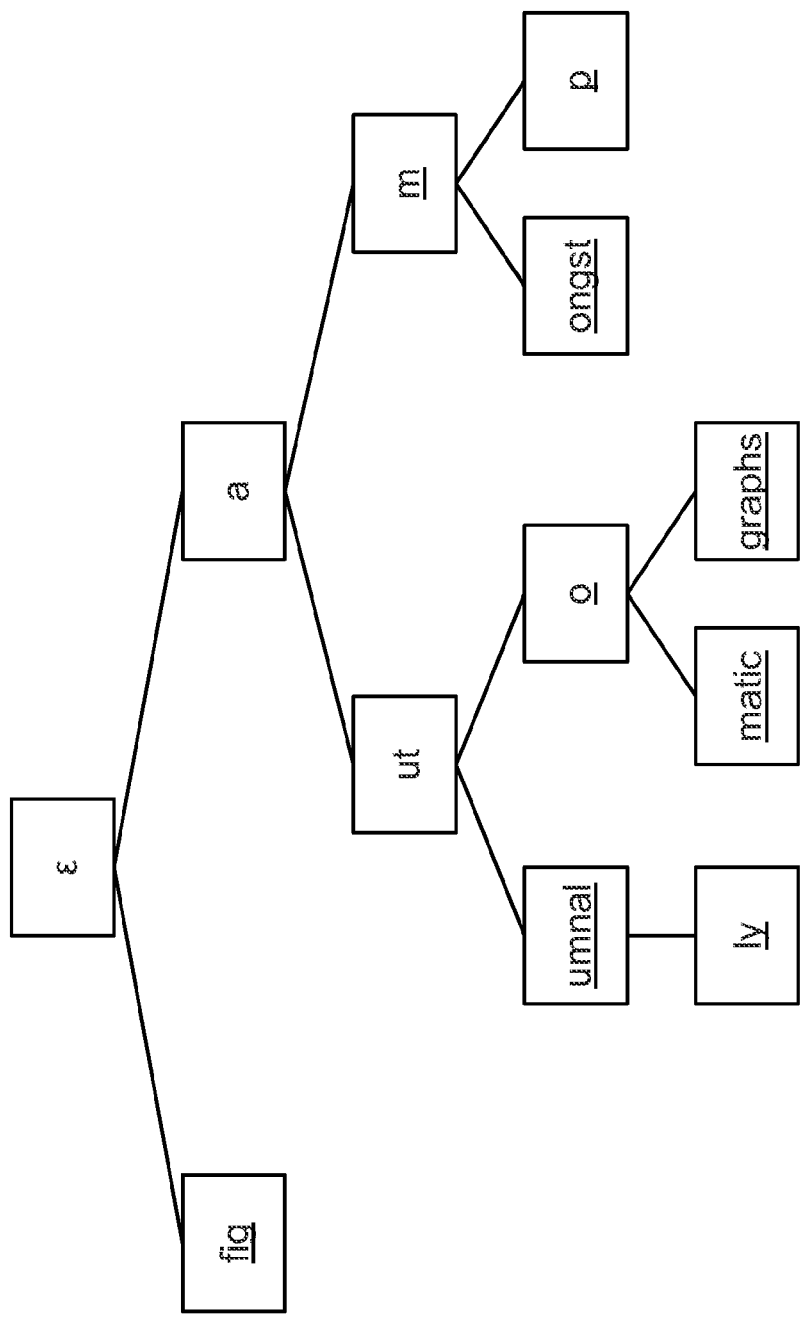
Figure 9:
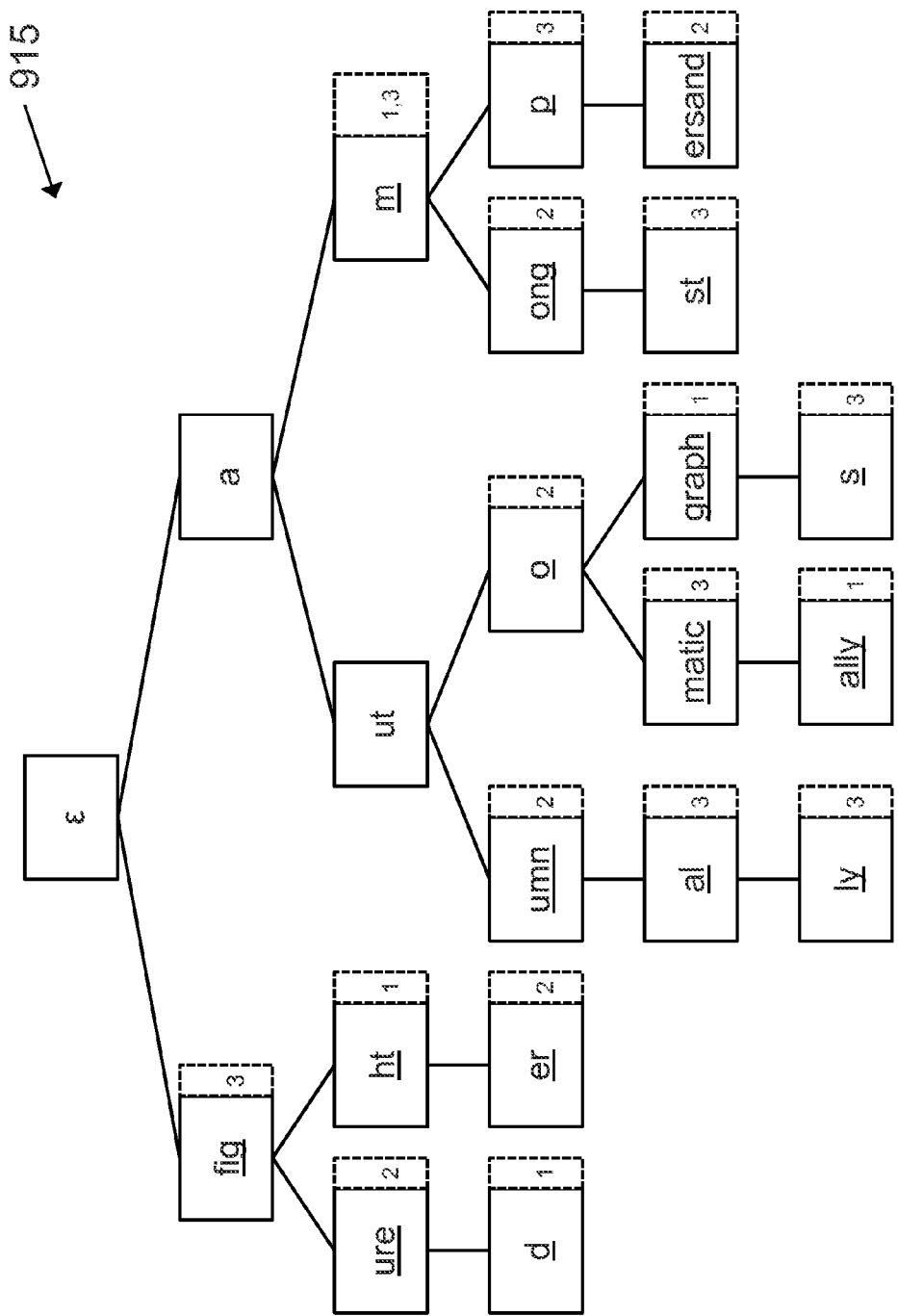
FIG. 9 shows a combined tree data structure.
Figure 10:
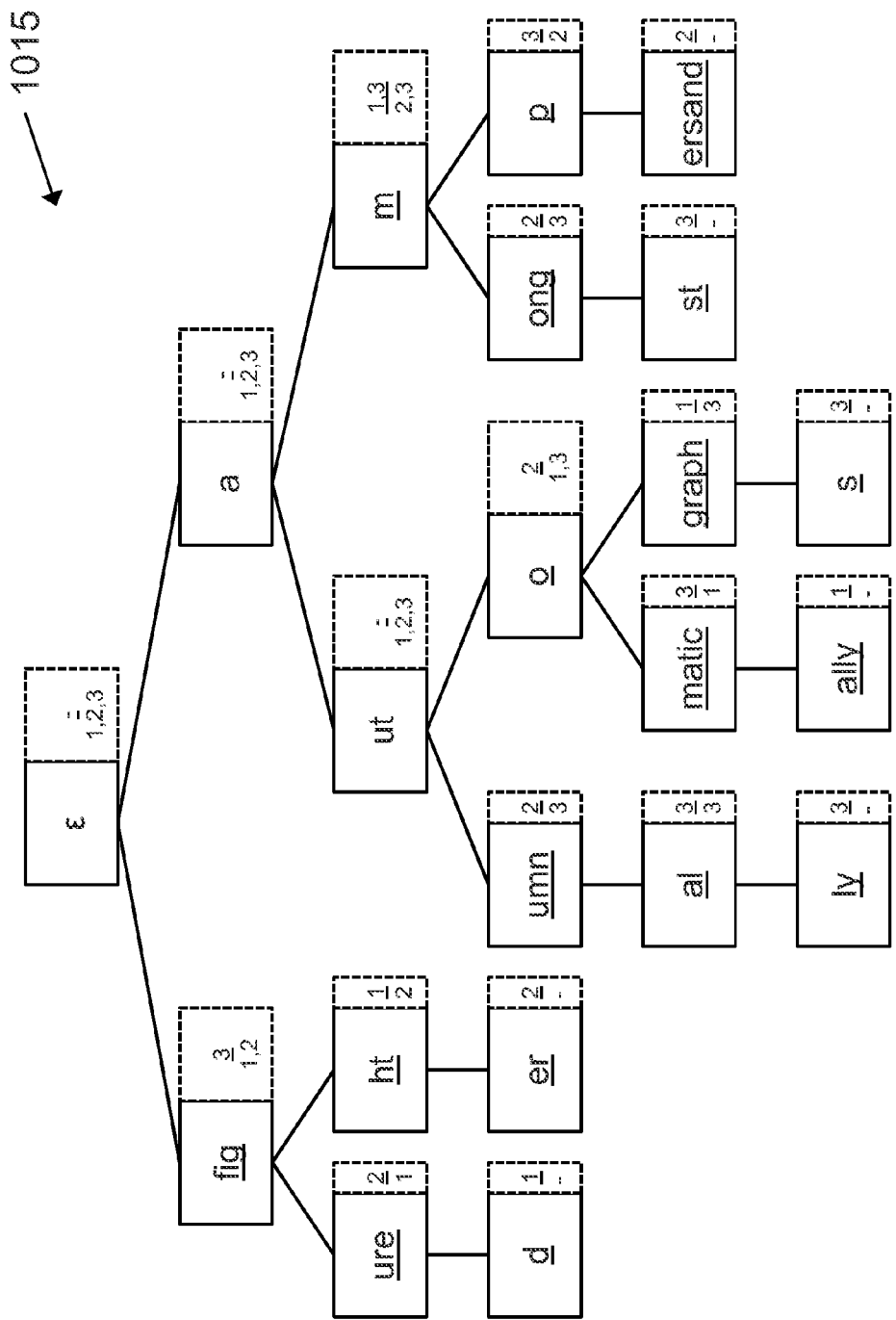
FIG. 10 shows a combined tree data structure.

FIGS. 8A to 8C show linguistic-related data stored in three tree data structures and FIGS. 9 and 10 show a combined tree data structure and an enhanced combined tree data structure respectively.

FIG. 8A shows a first tree data structure that includes a plurality of nodes, each with a respective node key. The first tree structure is associated with a first rank.

The following words are stored in nodes in the first tree data structure: figured, fight, automatically, autograph and am. Data may be associated with each of these words, so that if the first tree data structure were searched using one of these words as a search key, the corresponding data associated with the search key could be retrieved. However, if the first tree data structure were searched using a search key that is not one of these words, for example the word "car", no match would be found in the first tree data structure.

A root node in the first tree data structure has a first child node with a node key "fig", which has a common prefix with both "figured" and "fight", and a second child node with a node key "a", which has a common prefix with all of "automatically", "autograph" and "am". The first child node of the root node has two child nodes; a first child node with a node key "ured", which corresponds to the word "figured" and a second child node with a node key "ht", which corresponds to the word "fight". The second child node of the root node has two child nodes; a first child node with a node key "uto", which has a common prefix with both "automatically" and "autograph" (since it is a dependant node of the "a" node), and a second child with a node key "m", which corresponds to the word "am". The node with the node key "uto" also has two child nodes; a first child node with a node key "matically", which corresponds to the word "automatically" and a second child node with a node key "graph", which corresponds to the word "autograph".

The nodes associated with the "ured", "ht", "matically", "graph" and "am" node keys are underlined in FIG. 8A to indicate that they correspond to the words that are stored in the first tree data structure. Nodes, such as the "uto" node that are not underlined do not correspond to the words that are stored in the first tree data structure. Thus, searching the first tree data structure with the search key "auto", for example, would not return a prefix match within the first tree data structure.

FIG. 8B shows a second tree data structure that includes a plurality of nodes, each with a respective node key. The second tree structure is associated with a second rank, which is lower than the first rank.

The following words are stored in nodes in the second tree data structure: figure, fighter, autumn, auto, among and ampersand. Data may be associated with each of these words, so that if the first tree data structure were searched using one of these words as a search key, the corresponding data associated with the search key could be retrieved. However, if the second tree data structure were searched using a search key that is not one of these words, for example the word "car", no match would be found in the second tree data structure.

A root node in the second tree data structure has a first child node with a node key "fig", which has a common prefix with both "figure" and "fighter", and a second child node with a node key "a", which has a common prefix with all of "autumn", "auto", "among" and "ampersand". The first child node of the root node has two child nodes; a first child node with a node key "ure", which corresponds to the word "figure" and a second child node with a node key "hter", which corresponds to the word "fighter". The second child node of the root node has two child nodes; a first child node with a node key "ut", which has a common prefix with both "autumn" and "auto" (since it is a dependant node of the "a" node), and a second child node with a node key "m", which has a common prefix with both "among" and "ampersand" (since it is a dependant node of the "a" node). The node with the node key "ut" also has two child nodes; a first child node with a node key "umn", which corresponds to the word "autumn" and a second child node with a node key "o", which corresponds to the word "auto". The node with the node key "m" also has two child nodes; a first child node with a node key "ong", which corresponds to the word "among" and a second child node with a node key "persand", which corresponds to the word "ampersand".

The nodes associated with the "ure", "hter", "umn", "o", "ong" and "persand" node keys are underlined in FIG. 8B to indicate that they correspond to the words that are stored in the second tree data structure. Nodes, such as the "m" node that are not underlined do not correspond to the words that are stored in the second tree data structure. Thus, searching the second tree data structure with the search key "am", for example, would not return a prefix match within the second tree data structure. It is, however, to be noted that the word "am" is stored in the first tree data structure described above in relation to FIG. 8A.

It is also to be noted that although the word "auto" did not have a prefix match in the first tree data structure described above in relation to FIG. 8A (since the word "auto" was not stored in the first tree data structure), it is stored in the second tree data structure and would have a prefix match with the "o" leaf node if the second tree data structure were searched using the word "auto" as the search key.

FIG. 8C shows a third tree data structure that includes a plurality of nodes, each with a respective node key. The third tree structure is associated with a third rank, which is lower than both the first and second ranks.

The following words are stored in nodes in the third tree data structure: fig, autumnal, autumnally, auto, automatic, autographs, am, amongst and amp. Data may be associated with each of these words, so that if the third tree data structure were searched using one of these words as a search key, the corresponding data associated with the search key could be retrieved. However, if the third tree data structure were searched using a search key that is not one of these words, for example the word "car", no match would be found in the third tree data structure.

A root node in the third tree data structure has a first child node with a node key "fig", which corresponds to the stored word "fig", and a second child node with a node key "a", which has a common prefix with all of "autumnal", "autumnally", "auto", "automatic", "autographs", "am", "amongst" and "amp". The second child node of the root node has two child nodes; a first child node with a node key "ut", which has a common prefix with all of "autumnal", "autumnally", "auto", "automatic" and "autographs" (since it is a dependant node of the "a" node), and a second child node with a node key "m", which has a common prefix with both "amongst" and "amp" (since it is a dependant node of the "a" node). The node with the node key "ut" also has two child nodes; a first child node with a node key "umnal", which corresponds to the word "autumnal" and a second child node with a node key "o", which corresponds to the word "auto". The node with the "umnal" node key has an only child node with the node key "ly" which corresponds to the word "autumnally". The node with the node key "o" has two child nodes; a first child node with a node key "matic", which corresponds to the word "automatic" and a second child node with a node key "graphs", which corresponds to the word "autographs". The node with the node key "m" has two child nodes; a first child node with a node key "ongst", which corresponds to the word "amongst" and a second child node with a node key "p", which corresponds to the word "amp".

The nodes associated with the "fig", "umnal", "ly", "o", "matic", "graphs", "m", "ongst" and "p" node keys are underlined in FIG. 8C to indicate that they correspond to the words that are stored in the third tree data structure. Nodes, such as the "ut" node that are not underlined do not correspond to the words that are stored in the third tree data structure. Thus, searching the third tree data structure with the search key "aut", for example, would not return a prefix match within the third tree data structure.

The first, second and third tree data structures shown in FIGS. 8A to 8C may collectively be searched using the search key "fights", for example, which would return that the longest-prefix match is in the first tree data structure, with the node with the "ht" node key.

The first, second and third tree data structures shown in FIGS. 8A to 8C may be searched using the search key "autumn", which would return that the longest-prefix match is in the second tree data structure because it has an exact prefix-match in the second tree data structure, with the "umn" node but no prefix match at all in the first tree data structure, which is associated with a higher rank than the second tree data structure.

The first, second and third tree data structures shown in FIGS. 8A to 8C may be searched using the search key "authentic", which would return that none of the tree data structures has a prefix match. Even though the first tree data structure has an "a" node, the second tree data structure has "a" and "ut" nodes and the third tree data structure also has "a" and "ut" nodes, none of those nodes is underlined in FIGS. 8A to 8C and, as such, does not correspond with a stored word.

Determining the highest-ranked tree data structure in which a search key has a prefix match may require searching every tree data structure for a node having a prefix match with the search key. Determining, for example, that "authentic" does not have a prefix-matching node in any of the tree data structures requires five edge traversals. If there is a total of 'n' tree data structures, each containing at most 'm' nodes, then the general problem is O(n log(m)).

FIG. 9 shows a combined tree data structure.

The combined tree data structure combined or merges the data stored in the first, second and third tree data structures described above in relation to FIGS. 8A to 8C. In particular, the combined tree data structure stores the words: fig, figure, figured, fight, fighter, autumn, autumnal, autumnally, auto, automatic, automatically, autograph, autographs, am, among, amongst, amp and ampersand.

At least some of the nodes in the combined data tree are associated with respective node ranks which indicate the tree data structure from which they originate. In the combined tree data structure, only nodes that correspond to stored words in the first, second and third tree data structures are associated with respective node ranks. These nodes are underlined in FIG. 9.

For example, the "ht" node is associated with node rank "1" since it corresponds to an underlined node in the first tree data structure described above in relation to FIG. 8A. The "m" node is associated with node ranks "1" and "3" since it corresponds to an underlined node in both the first tree data structure described above in relation to FIG. 8A and the third tree data structure described above in relation to FIG. 8C. However, the "ut" node is not associated with a node rank because it does not correspond to an underlined node in any of the first, second and third tree data structures.

With reference to the combined tree data structure 915 shown in FIG. 9, determining that "authentic" does not have a prefix match in the combined data tree structure requires only two edge traversals, and the general problem is of O(log (mn)). The word "authentic" does not have a prefix match in the combined data tree because, even though it would appear to have a match with the "a" and the "ut" nodes, neither of those nodes is associated with a respective node rank.

However, this results in the situation where determining that "autumnally" first matches a node associated with the second-highest node rank requires five edge traversals since the search has to traverse from the node associated with the node key "autumn" to the leaf node associated with the node key "autumnally" to ensure there is no longer prefix-matching node associated with a higher node rank than the rank of the node having the "autumn" key.

FIG. 10 shows an enhanced combined tree data structure.

As can be seen from the enhanced combined tree data structure 1015 shown in FIG. 10, each of the nodes is associated with a respective dependant node rank identifier, as explained in detail above. In some embodiments, not all of the nodes are associated with dependant node rank identifiers. For example, at least the root node may not be associated with a dependant node rank identifier.

If the enhanced combined tree data structure were to be searched for the term "autumnally", the search could terminate at the node associated with the node key "autumn" since this node has a prefix match with the search key and has a higher node rank, the second-highest node rank, than any other node that could have a longer prefix match with the search key, both of which do, in fact, have longer prefix matches with the search key but are associated with the lowest node rank and, thus, would not be selected as a preferred prefix-matching node.

In some embodiments, in addition to associating a node with a node rank and a dependant node rank identifier, additional information can be associated with a node. Such additional information can include, but is not limited to being: information identifying why a given node rank is associated with a given node, for example as a result of the data source from which it originates; information identifying what action should be taken when a search key matches a node key of a given node, for example to handle using blacklisted traffic handling; and/or timestamp information identifying when a given node should be removed from the tree data structure, when the associated node rank should be reviewed or the like.

Implementing the above-described searching method on consumer hardware may result in many costly memory dereferences, each time traffic is received having a prefix match in the tree data structure. The number of memory dereferences may be reduced by determining the size of the structure required for each node with reference to the size of the processor's cache lines, and storing the nodes in unrolled linked lists, that store several linked nodes together rather than a single node by itself and that are sized to fit into a single cache line. The nodes may be ordered in the lists according to the order in which they would be required during search. Storing the nodes in this way permits several nodes to be loaded for the same cost as would otherwise be needed for a single node. For example, it may be possible to load a given node, its child nodes and its grandchild nodes with a single memory access, rather than requiring one memory access for the given node, a second memory access for its child nodes, and a third memory access for its grandchild nodes.

Depending on the hardware and specific problem being solved, the maximum number of children at each node can be varied. The tree data structures in the examples above have at most two children from each node, but adding, for example, "autonomous" to the tree data structure 1015 shown in FIG. 10 would leave the "o" node with three children. If the node keys associated with nodes in the tree data structure 1015 are made up only of lower-case letters, each node could have up to twenty-six children.

As an alternative to having large numbers of possible child nodes, letters could be grouped together, for example by adding extra intermediate nodes to distinguish between groups of letters. For example, one child of a given node could be associated with letters a-m and the other child node of the given node could be associated with the letters n-z. In such an example, no node would have more than thirteen children, albeit at the expense of having deeper tree structures.

Conversely, characters could be combined to increase the number of potential children, for example by choosing the next node when descending the tree data structure on the basis of the next several characters (as opposed to on the basis of the next one character). If the node keys were associated with only lower-case letters, the next child when descending the tree data structure could be based on the next two characters. This would mean that each node would have up to $26^2=676$ children.

Since some of these "super-nodes" could effectively contain multiple standard nodes, each node may store additional information to allow such standard nodes to be distinguished in the event that a searching key finished part way into a node. For example, if the super-node were associated with the node key 'er' and the search key finished with just 'e', then the additional information could identify where data that is associated with a standard node associated with just the letter 'e' can be retrieved.

The above embodiments are to be understood as illustrative examples of the invention. Further embodiments of the invention are envisaged.

For example, in some embodiments described above, nodes are assigned a node rank. If a prefix-matching node is associated with a given node rank, it does not matter whether or not there is longer prefix match with a node associated with a lower node rank than the given node rank.

In other embodiments, however, a more complicated preferred prefix-matching node selection rule may be used. For example, in a traffic prioritization scenario, it may be desirable to use a more advanced rule for deciding the priority to assign to incoming traffic. As an example, it may be desirable to identify the highest-ranked prefix-matching node and, if such a match exists, it may also be desirable to identify prefix matches with a node associated with a node rank that is exactly one lower than the node rank associated with the highest-ranked prefix-matching node. For example, if a prefix-matching node is associated with the $i^{th}$-highest node rank, it may be desirable to continue the search to determine whether there is a longer prefix match with a node that is associated with the $i-1^{th}$-highest node rank, in addition to continuing the search to determine whether there is a longer prefix match with a higher-ranked node. In the context of traffic handling, for example, searching a tree data structure using a source address of a traffic source as the search key may find a first prefix match associated with the subnet in which the traffic source is located and a second, longer prefix match associated with the traffic source itself. It may then be determined whether to handle the traffic using a traffic-handling rule associated with the subnet or using a traffic-handling rule associated with the traffic source itself, for example based on one or more further factor, such as the type of incoming traffic.

In general, when descending the tree data structure, a different preferred prefix-matching node selection rule may be applied to decide whether to keep descending the tree data structure, depending on the specifics of what types of matches are desired. For example, the search could continue to descend the tree data structure after a first prefix-matching node is found if the first prefix-matching node has descendent nodes associated with higher node ranks or if any of the dependant nodes has a node rank that is exactly one node-rank lower than the node rank of the first prefix-matching node.

In some of the embodiments described above, the IP addresses have been described as being IPv4 addresses, which are relatively short. However, the searching methods described herein are particularly suited to lookups in relation to longer Internet Protocol version 6 (IPv6) addresses, where searching algorithms may be liable to failing to scale up to the much deeper tree data structure that would be required with the longer IPv6 addresses.

In some embodiments, described above, a given node is associated with single node rank and may also be associated with a dependant node rank identifier. However, in other embodiments, a given node can be associated with a plurality of different node ranks. For example, with reference to FIGS. 9 and 10, the node that is associated with the node key "am" is associated with both node rank 1 and node rank 3. In this case, the "am" node is associated with a plurality of ranks because it originated from both the first tree data structure shown in FIG. 8A (as a leaf node) and in the third tree data structure shown in FIG. 8C (as an internal node). In such cases in which a prefix-matching node is associated with a plurality of node ranks, the prefix-matching node may be selected as the preferred prefix-matching node if any of the plurality of node ranks associated with the prefix-matching node is a preferred node rank relative to the node ranks associated with nodes that may have a longer prefix match with the search key than the prefix-matching node. With reference to FIGS. 9 and 10, searching the tree data structures 915, 1015 with the search key "amongst" would identify the "m" node as a prefix-matching node and would select the "m" node as a preferred prefix-matching node on the basis that one of its node ranks, node rank 1, is a higher node rank than the node ranks, node ranks 2 and 3, associated with the nodes that may, and in fact do, have a longer prefix match with the search key. The "m" node is selected as the preferred prefix-matching node despite also being associated with node rank 3 which is lower than the node rank, node rank 2, associated with the "ong" node and is the same as the node rank, node rank 3, associated with the "st" node.

This can be contrasted with an approach in which a search always returns a value associated with a node having the longest prefix match; in such approaches, a decision cannot be made on the basis of the results of the search how to process the traffic since the traffic would be processed in a manner associated with the longest prefix match.

In some embodiments described above, a given node is associated with a node rank and a dependant node rank identifier. In some embodiments, the node rank of a given node may be stored separately from the dependant node rank identifier. In other embodiments, the node rank may be stored with the dependant node rank identifier.

In some embodiments, the dependant node rank identifier identifies both the node rank of a node with which it is associated and the node ranks of its dependant nodes. In other embodiments, the dependant node rank identifier may simply indicate whether there is a dependant node that has a preferred node rank than the given node, for example by specifying a predetermined bit as a '1' or a '0'. In such other embodiments, if the given node is identified as a prefix-matching node, the dependant node rank identifier may be consulted to determine whether there is a dependant node that has a preferred node rank, irrespective of whether or node the actual rank of that node is also included in the dependant node rank identifier.

In some embodiments described above, the traffic parameter which is used as a search key is the IP address of the traffic source from which the traffic originates. In other embodiments, the traffic parameter may be another parameter of the traffic, such as a traffic-type identifier, a telephone number of the source from which the traffic originates (for example if the traffic comprises voice media traffic) or the like.

In some of the embodiments described above, an attempt is made to find a prefix-matching node that has a prefix match with the search key and which has a preferred node rank relative to a node rank associated with a node which may have a longer prefix match with the search key. In some embodiments, both the prefix-matching node and the node which may have a longer prefix match with the search key have respective node ranks stored against them, for example in node rank indicators 231, 232, 234, 235 described above in relation to FIG. 2. In other embodiments, a node rank may be a logical rank associated with the node which determines its relative importance or rank to other nodes. In such other embodiments, the node rank may be implicitly associated with a given node rather than being explicitly associated with the given node.

For example, a tree data structure may comprise a plurality of nodes, some of which are associated with standard traffic handling and others of which are associated with non-standard traffic handling. Instead of storing respective node ranks in node rank indicators against each of the sets of nodes, a flag may be stored against, for example, the nodes that are associated with non-standard traffic handling and no flag may be stored against the nodes that are associated with standard traffic handling. In such an example, the flag associated with the nodes associated with non-standard traffic handling indicates a higher relative rank or importance than the implicit rank of the (non-flagged) nodes associated with standard traffic handling.

Some embodiments provide a method of searching a database using a search key, the database containing data stored in a tree data structure, the tree data structure comprising a plurality of nodes that are associated with respective node keys, the method comprising:

searching the tree data structure to attempt to identify a preferred prefix-matching node on the basis of attempting to find a node that has a longer prefix match with the search key than a prefix-matching node that has a prefix match with the search key, wherein at least some of the nodes are associated with at least one respective node rank;

searching the tree structure to attempt to identify a preferred prefix-matching node on the basis of attempting to find a prefix-matching node that has a prefix match with the search key and which has a preferred node rank relative to a node rank associated with a node which may have a longer prefix match with the search key; and selecting the prefix-matching node which has the preferred node rank, if identified, as a preferred prefix-matching node, in preference to a node having a less-preferred node rank which may have a longer prefix match with the search key.

In some such embodiments, a prefix-matching node is associated with a dependant node rank identifier which indicates at least a node rank of a node which may have a longer prefix match with the search key than the prefix-matching node, and wherein the method comprises selecting the prefix-matching node as a preferred prefix-matching node on the basis of the dependant node rank identifier.

Some embodiments provide a method of storing data in a database, the database containing data stored in a tree data structure, the tree data structure comprising a first node that is associated with a first node key, the method comprising:

associating the first node with the first node rank;

adding a second node to the tree data structure as an ancestor or dependant node of the first node;

associating the second node with a second node key; and associating the second node with a second node rank.

Some such embodiments comprise:

adding the second node as an ancestor node of the first node; and identifying the first node rank in a dependant node rank identifier associated with the second node.

Other such embodiments comprise:

adding the second node as a dependant node of the first node; and identifying the second node rank in a dependant node rank identifier associated with the first node.

Some embodiments provide a method of searching a database using a search key, the database containing data stored in a tree structure, the tree structure comprising a plurality of nodes including a first node that is associated with a first node key and a first node rank, and a second node that is a dependant node of the first node and that is associated with a second node key and a second node rank, the second node potentially being a longer-prefix-matching node than the first node, wherein searching the database comprises:

determining that the first node is a prefix-matching node; and identifying the first node as a preferred prefix-matching node if the first node rank is preferable relative to the second node rank notwithstanding the second node potentially being a longer-prefix-matching node than the first node.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of searching a database using a search key, the database containing data stored in a tree data structure including a plurality of nodes that are associated with respective node keys, the method comprising:

searching the tree data structure to attempt to identify a preferred prefix-matching node on the basis of attempting to find a node that has a longer prefix match with the search key than a prefix-matching node that has a prefix match with the search key, wherein at least some of the nodes are associated with at least one respective node rank;

searching the tree structure to attempt to identify a preferred prefix-matching node on the basis of attempting to find a prefix-matching node that has a prefix match with the search key and which has a preferred node rank relative to a node rank associated with a node which may have a longer prefix match with the search key;

determining that the prefix-matching node, if identified, has the preferred node rank based at least in part on using a dependent node rank identifier associated with the prefix matching node, the dependent node rank identifier indicating at least a node rank of a node which may have a longer prefix match with the search key than the prefix-matching node; and selecting the prefix-matching node which has the preferred node rank, if identified, as a preferred prefix-matching node, in preference to a node having a less-preferred node rank which may have a longer prefix match with the search key.

2. The method according to claim 1, further comprising:

selecting the prefix-matching node as the preferred prefix-matching node if its node rank is at least one rank higher than the less-preferred node rank.

3. The method according to claim 1, wherein the dependent node rank identifier indicates the node ranks of every node that may have a longer prefix match with the search key than the prefix-matching node.

4. The method according to claim 1, wherein the tree data structure comprises a trie.

5. The method according to claim 1, wherein the tree data structure comprises a radix trie.

6. The method according to claim 1, wherein the dependent node rank identifier indicates that the node rank of the node which may have a longer prefix match with the search key than the prefix-matching node has a less preferred node rank relative to the node rank associated with the prefix-matching node.

7. A method of handling data in a communication system, the method comprising:

receiving traffic comprising a traffic parameter;

searching a traffic-handling database using a search key that is based on the traffic parameter and a method of searching the database according to claim 1;

retrieving traffic-handling information associated with the preferred prefix matching node; and handling the received traffic based on the traffic-handling information.

8. The method according to claim 7, wherein the communication system comprises a plurality of network parts, and wherein the method further comprises:

associating a given node with incoming traffic from a given network part;

associating the given node with a node rank based on a manner in which incoming traffic from the given network part is to be handled, wherein a higher node rank is associated with a preferred traffic-handling scheme.

9. The method according to claim 7, wherein a first node rank is associated with high-priority traffic and wherein a second node rank is associated with low-priority traffic, incoming traffic being handled based on its priority.

10. The method according to claim 7, wherein the traffic parameter comprises a traffic source identifier.

11. An apparatus for searching a database using a search key, the database containing data stored in a tree data structure including a plurality of nodes that are associated with respective node keys, the apparatus comprising a processor coupled to a memory, the processor being arranged to:
- search the tree data structure to attempt to identify a preferred prefix-matching node on the basis of attempting to find a node that has a longer prefix match with the search key than a prefix-matching node that has a prefix match with the search key, wherein at least some of the nodes are associated with at least one respective node rank;
- search the tree structure to attempt to identify a preferred prefix-matching node on the basis of attempting to find a prefix-matching node that has a prefix match with the search key and which has a preferred node rank relative to a node rank associated with a node which may have a longer prefix match with the search key;
- determine that the prefix-matching node, if identified, has the preferred node rank based at least in part on using a dependent node rank identifier associated with the prefix matching node, the dependent node rank identifier indicating at least a node rank of a node which may have a longer prefix match with the search key than the prefix-matching node; and
- select the prefix-matching node which has the preferred node rank, if identified, as a preferred prefix-matching node, in preference to a node having a less-preferred node rank which may have a longer prefix match with the search key.

12. A computer program product comprising a non-transitory computer-readable storage medium having computer readable instructions stored thereon, the computer readable instructions being executable by a computerized device to cause the computerized device to perform a method for searching a database using a search key, the database containing data stored in a tree data structure including a plurality of nodes that are associated with respective node keys, the method comprising:
- searching the tree data structure to attempt to identify a preferred prefix-matching node on the basis of attempting to find a node that has a longer prefix match with the search key than a prefix-matching node that has a prefix match with the search key,
- wherein at least some of the nodes are associated with at least one respective node rank, and wherein the method comprises:
- searching the tree structure to attempt to identify a preferred prefix-matching node on the basis of attempting to find a prefix-matching node that has a prefix match with the search key and which has a preferred node rank relative to a node rank associated with a node which may have a longer prefix match with the search key;
- determining that the prefix-matching node, if identified, has the preferred node rank based at least in part on using a dependent node rank identifier associated with the prefix matching node, the dependent node rank identifier indicating at least a node rank of a node which may have a longer prefix match with the search key than the prefix-matching node; and
- selecting the prefix-matching node which has the preferred node rank, if identified, as a preferred prefix-matching node, in preference to a node having a less-preferred node rank which may have a longer prefix match with the search key.

* * * * *